US010184800B2

(12) United States Patent
Fowe et al.

(10) Patent No.: US 10,184,800 B2
(45) Date of Patent: Jan. 22, 2019

(54) SHARING SAFETY DRIVING METRICS FOR NAVIGABLE SEGMENTS

(71) Applicant: HERE Global B.V., Eindhoven (NL)

(72) Inventors: James Fowe, Chicago, IL (US); Pradeep Maddineni, Lombard, IL (US)

(73) Assignee: HERE Global B.V., Eindhoven (NL)

( * ) Notice: Subject to any disclaimer, the term of this patent is extended or adjusted under 35 U.S.C. 154(b) by 104 days.

(21) Appl. No.: 15/156,402

(22) Filed: May 17, 2016

(65) Prior Publication Data

US 2017/0336213 A1 Nov. 23, 2017

(51) Int. Cl.
*G01C 21/26* (2006.01)
*B60W 10/00* (2006.01)
*G01C 21/32* (2006.01)

(52) U.S. Cl.
CPC ............ *G01C 21/26* (2013.01); *B60W 10/00* (2013.01); *G01C 21/32* (2013.01)

(58) Field of Classification Search
CPC ..... G01C 21/26; G01C 21/28; G01C 21/3407
See application file for complete search history.

(56) References Cited

U.S. PATENT DOCUMENTS

| 6,047,234 | A | 4/2000 | Cherveny et al. |
| 6,401,027 | B1 * | 6/2002 | Xu ...................... G08G 1/0104 340/988 |
| 6,473,690 | B1 * | 10/2002 | Joshi ...................... G01C 21/30 342/357.59 |
| 7,421,334 | B2 | 9/2008 | Dahlgren et al. |
| 8,606,512 | B1 * | 12/2013 | Bogovich .............. G06Q 40/08 340/995.28 |
| 8,935,036 | B1 | 1/2015 | Christensen et al. |
| 8,948,996 | B2 | 2/2015 | Warkentin |
| 8,996,234 | B1 * | 3/2015 | Tamari ................ G07C 5/0808 701/123 |
| 9,165,477 | B2 | 10/2015 | Wilson |
| 9,189,897 | B1 | 11/2015 | Stenneth |

(Continued)

OTHER PUBLICATIONS

Cardarelli et al., "Cloud Robotics Paradigm for Enhanced Navigation of Autonomous Vehicles in Real World Industrial Applications", International Conference on Intelligent Robots and Systems, 2015, 6 pages.

(Continued)

*Primary Examiner* — Mary Cheung
(74) *Attorney, Agent, or Firm* — Alston & Bird LLP

(57) ABSTRACT

A method is disclosed, comprising holding available, by at least a first apparatus, data associated with each road segment of at least one road segment, said data comprising (i) a representative of a first metric associated with spatial properties associated with the respective road segment; (ii) at least one representative of a second metric associated with at least one dynamic event associated with the respective road segment; and (iii) at least one representative of a third metric associated with a speed associated with the respective road segment, and wherein the method comprises, for at least one road segment of the at least one road segment, providing, by said at least one first apparatus, a safety data of the respective road segment at least partially based on the representative of the first metric, the at least one representative of the second metric and the at least one representative of the third metric associated with the respective road segment.

20 Claims, 10 Drawing Sheets

(56) References Cited

U.S. PATENT DOCUMENTS

| | | | |
|---|---|---|---|
| 2004/0143416 A1* | 7/2004 | Hattori | B60K 31/0066 |
| | | | 702/157 |
| 2010/0036599 A1 | 2/2010 | Froeberg et al. | |
| 2010/0070253 A1* | 3/2010 | Hirata | G08G 1/0104 |
| | | | 703/8 |
| 2010/0082226 A1* | 4/2010 | Mukherjee | G08G 1/0104 |
| | | | 701/118 |
| 2010/0207787 A1* | 8/2010 | Catten | G06F 17/30241 |
| | | | 340/905 |
| 2013/0154854 A1* | 6/2013 | Chen | G08G 1/096741 |
| | | | 340/905 |
| 2013/0328861 A1 | 12/2013 | Arikan et al. | |
| 2014/0095062 A1* | 4/2014 | Wang | G01C 21/32 |
| | | | 701/409 |
| 2014/0350970 A1 | 11/2014 | Schumann et al. | |
| 2015/0057831 A1* | 2/2015 | Finlow-Bates | G08G 1/09626 |
| | | | 701/1 |
| 2016/0138930 A1* | 5/2016 | Akiyama | G01C 21/3461 |
| | | | 701/465 |
| 2017/0061787 A1* | 3/2017 | Lorkowski | G01C 21/32 |
| 2017/0278402 A1* | 9/2017 | Yalla | G08G 1/167 |

OTHER PUBLICATIONS

"2015 BMW X5 M review: Engineering triumphs over physics", Roadshow by CNET, Retrieved on Sep. 22, 2016, Webpage available at : https://www.cnet.com/roadshow/auto/2015-bmw-x5-m/review/.

European Patent Office, Partial European Search Report and Provisional Opinion for Application No. 17171573.3, dated Oct. 27, 2017, 13 pages, Germany.

European Patent Office, Extended European Search Report for Application No. 17171573.3, dated Mar. 8, 2018, 15 pages, Germany.

\* cited by examiner

SHARING SAFETY DRIVING METRICS FOR NAVIGABLE SEGMENTS

FIELD OF THE DISCLOSURE

The invention relates to the field of providing safety data related with road segments which might be used for navigation purposed, in particular of autonomous vehicles.

BACKGROUND

The current effort by various companies working on autonomous cars are mostly in isolation, every car OEM has their own unique prototype of how they think autonomous cars should be and there is little discussion about standard and communication protocols/specification amongst these cars. This lack of collaboration can cause huge delay in the development and adoption of the technology and poor performance/safety of the autonomous vehicles (AV).

SUMMARY OF SOME EMBODIMENTS OF THE INVENTION

According to a first exemplary aspect of the invention, a method is disclosed, which comprises holding available, by at least a first apparatus, data associated with each road segment of at least one road segment, said data comprising (i) representative of a first metric associated with spatial properties associated with the respective road segment; (ii) at least one representative of a second metric associated with at least one dynamic event associated with the respective road segment; and (iii) at least one representative of a third metric associated with a speed associated with the respective road segment, and wherein the method comprises, for at least one road segment of the at least one road segment, providing, by said at least one first apparatus, a safety data of the respective road segment at least partially based on the representative of the first metric, the at least one representative of the second metric and the at least one representative of the third metric associated with the respective road segment.

The method according to the first exemplary aspect of the invention may for example at least partially be performed by the first apparatus.

According to the first exemplary aspect of the invention, furthermore a first apparatus is disclosed, which comprises means for at least partially realizing the method according to the first exemplary aspect of the invention. The means of the first apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the first apparatus may comprise various other components, like a radio interface, a data interface, a user interface etc.

For example, the first apparatus comprises at least one processor and at least one memory including computer program code, the at least one memory and the computer program code configured to, with the at least one processor, cause an apparatus at least to perform at least partially the method and/or the steps of the method according to the first exemplary aspect of the invention.

Furthermore, for instance, the first apparatus may represent a server.

According to the first aspect of the invention, furthermore a system is disclosed, which comprises the first apparatus.

According to a second exemplary aspect of the invention, a method, performed by a mobile device, is disclosed, performed by at least a second apparatus, said method comprising receiving safety data associated with at least one road segment, said data comprising for each of the least one road segment: (i) a representative of a first metric associated with spatial properties associated with the respective road segment; (ii) at least one representative of a second metric associated with at least one dynamic event associated with the respective road segment; and (iii) at least one representative of a third metric associated with a speed associated with the respective road segment.

The method according to the second exemplary aspect of the invention may for example be a method for receiving the safety data to perform navigation based on the received safety data, e.g. for an autonomous vehicle.

According to the second exemplary aspect of the invention, furthermore a second apparatus is disclosed, which comprises means for at least partially realizing the method according to the second exemplary aspect of the invention. The means of the second apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the second apparatus may comprise various other components, like a radio interface, a data interface, a user interface etc.

For example, the second apparatus comprises at least one processor and at least one memory including computer program code, the at least one memory and the computer program code configured to, with the at least one processor, cause an apparatus (e.g. the mobile device) at least to perform at least partially the method and/or the steps of the method according to the second exemplary aspect of the invention.

According to a third exemplary aspect of the invention, a method, at least partially performed by a first apparatus and a second apparatus, is disclosed, which comprises the steps of the method according to the first exemplary aspect of the invention and the steps of the method according to the second exemplary aspect of the invention.

According to a fourth exemplary aspect of the invention, furthermore a system is disclosed, which comprises the first apparatus according to the first exemplary aspect of the invention and at least one second apparatus according to the second exemplary aspect of the invention.

In the following, the features of exemplary embodiments according to the first, second, third and fourth exemplary aspects of the invention are described by way of examples.

According to a corresponding exemplary embodiment of the methods according to the first and second exemplary aspect of the invention, a representative of the first metric may be a value being indicative of the suitability of driving on the road segment based on spatial properties associated with the road segment, and a representative of the at least one representative of the second metric may be a value being indicative of the suitability for driving on the road segment based on the at least one dynamic event associated with the respective road segment, and wherein a representative of the at least one representative of a third metric associated with a speed associated with the respective road segment may be indicative of the suitability for driving on the road segment based on the speed associated with the respective segment.

According to a corresponding exemplary embodiment of the methods according to the first and second exemplary aspect of the invention, said representative of the first metric indicates a measure how curvy a trajectory of the road segment is.

According to a corresponding exemplary embodiment of the methods according to the first and second exemplary aspect of the invention, said representative of the first metric indicates a sinuosity of the road segment.

According to a corresponding exemplary embodiment of the methods according to the first and second exemplary aspect of the invention, the spatial properties are associated with one of the following dimensions: (i) two-dimensional; and (ii) three-dimensional.

According to a corresponding exemplary embodiment of the method according to the first exemplary aspect of the invention, the method comprises determining a representative of the first metric associated with spatial properties based on map-data associated with the respective road segment.

According to a corresponding exemplary embodiment of the method according to the first exemplary aspect of the invention, said determining a representative of the first metric associated with spatial properties is based on at least one angle in a trajectory of the road segment.

According to a corresponding exemplary embodiment of the method according to the first exemplary aspect of the invention, said determining a representative of the first metric associated with spatial properties is based on at least one of: (i) number of intersections associated with the road segment; and (ii) number of lanes associated with the road segment.

According to a corresponding exemplary embodiment of the method according to the first exemplary aspect of the invention, the method comprises receiving a plurality of sets of data from at least one mobile device, which for instance may be represented by at least one second apparatus of the at least one second apparatus according to the second exemplary aspect of the invention, wherein a set of data from the sets of data comprises at least one of: (i) an identifier (ID), (ii) a timestamp (time), (iii) velocity data, (iv) location based data, (v) rating data, (vi) feedback data.

According to a corresponding exemplary embodiment of the method according to the first exemplary aspect of the invention, the method comprises determining at least one representative of the at least one representative of a second metric associated with at least one dynamic event associated with the respective road segment at least partially based on at least one set of data associated with this road segment.

According to a corresponding exemplary embodiment of the methods according to the first and second exemplary aspect of the invention, a representative of the second metric associated with at least one dynamic event is indicative of a degree of uncertainty in safe driving of the respective road segment.

According to a corresponding exemplary embodiment of the methods according to the first and second exemplary aspect of the invention, the at least one dynamical event comprises at least one of a: (i) weather event; (ii) incident event; (iii) venue event; (iv) movement of objects on the road segment.

According to a corresponding exemplary embodiment of the methods according to the first and second exemplary aspect of the invention, said movement of objects on the road segments includes at least one of movement of pedestrians and movement of bicycles.

According to a corresponding exemplary embodiment of the method according to the first exemplary aspect of the invention, the representative of the second metric is determined based on location based data associated with the respective road segment.

According to a corresponding exemplary embodiment of the method according to the first exemplary aspect of the invention, a representative of the second metric is determined based on feedback data or on rating data.

According to a corresponding exemplary embodiment of the methods according to the first and second exemplary aspect of the invention, said at least one representative of a second metric associated with at least one dynamic event associated with the respective road segment represents at least two representatives of a second metric, wherein each representative of these at least two representatives of a second metric represents a second metric associated with at least one dynamic event of the respective road segment is associated with one of a point in time and a period of time.

According to a corresponding exemplary embodiment of the method according to the first exemplary aspect of the invention, the method comprises determining at least one representative of the at least one representative of a third metric associated with a speed associated with the respective road segment at least partially based on at least one set of data associated with this road segment.

According to a corresponding exemplary embodiment of the method according to the first exemplary aspect of the invention, a representative of the third metric is determined based on an average speed associated with the respective road segment.

According to a corresponding exemplary embodiment of the method according to the first exemplary aspect of the invention, the average speed of the respective road segment is determined based on location based data.

According to a corresponding exemplary embodiment of the methods according to the first and second exemplary aspect of the invention, the representative of the third metric is a value being proportional or inversely proportional to the average speed of the respective road segment.

According to a corresponding exemplary embodiment of the methods according to the first and second exemplary aspect of the invention, said at least one representative of a third metric associated with a speed associated with the respective road segment represents at least two representatives of a third metric, wherein each representative of these at least two representative of a third metric represents a third associated with a speed associated with the respective road segment is associated with one of a point in time and a period of time.

According to a corresponding exemplary embodiment of the methods according to the first and second exemplary aspect of the invention, the representative of a first metric associated with spatial properties is represented by a value within a predefined range, and wherein each of the at least one at least one representative of a second metric associated with at least one dynamic event associated with the respective road segment is represented by a value within a predefined range, and wherein each of the at least one representative of a third metric associated with a speed associated with the respective road segment is represented by a value within a predefined range.

According to a corresponding exemplary embodiment of the methods according to the first and second exemplary aspect of the invention, said at least one road segment represents a plurality of road segments, said method further comprising aggregating at least two contiguous road segments into a single road segment based on the data associated with the at least two contiguous road segments.

According to a corresponding exemplary embodiment of the method according to the first exemplary aspect of the invention, said aggregating is performed in a way that representatives of the at least two contiguous road segments are within in a similarity measure.

According to a corresponding exemplary embodiment of the method according to the first exemplary aspect of the invention, said similarity measure is a predefined distance which is determined based on representatives of a first road segment and a second road segments of the at least two contiguous segments based on at least one of: (i) a first difference or ratio between a representative of a first metric associated with spatial properties associated with the first road segment and a representative of a first metric associated with spatial properties associated with the second road segment; (ii) a second difference or ratio between a representative of a second metric associated with at least one dynamic event associated with the first road segment and a representative of a second metric associated with at least one dynamic event associated with the second road segment; and (iii) a third difference or ratio between a representative of a third metric associated with a speed associated with the first road segment and a representative of a third metric associated with a speed associated with the second road segment.

According to a corresponding exemplary embodiment of the method according to the first exemplary aspect of the invention, said determining the predefined distance comprises adding an absolute value of the first difference, an absolute value of the second difference and adding an absolute value of the third difference.

According to a corresponding exemplary embodiment of the method according to the first exemplary aspect of the invention, the at least two contiguous road segments are two contiguous road segments, and wherein the two contiguous road segments fulfill at least one of the following geometric criteria: (i) an intersection angle between the two contiguous road segments is higher than a predefined value; (ii) the sum of the lengths of the two contiguous road segments is less than a threshold.

According to a corresponding exemplary embodiment of the method according to the first exemplary aspect of the invention, said aggregating at least two contiguous road segments into a single road segment comprises, selecting a first road segment of the plurality of road segments, and checking whether there is one more road segment in the plurality of road segments being contiguous to the first road segment, wherein the data associated with each road segment of the one or more road segment fulfils the similarity measure in conjunction with data associated with the first road segment, and optionally, wherein each road segment of the one or more road segment fulfils the at least one geometric criteria in conjunction with the first road segment.

According to a corresponding exemplary embodiment of the method according to the first exemplary aspect of the invention, in case that said checking identified two or more road segments, selecting the road segment of the two or more road segments that forms an intersection angle with the first road segment closest to 180 degrees, and aggregating the selected road segment with the first road segment to a single road segment.

According to a corresponding exemplary embodiment of the method according to the first exemplary aspect of the invention, the method comprises determining data associated with the single road segment at least partially based on the data associated with the aggregated at least two road segments.

According to a corresponding exemplary embodiment of the methods according to the first and second exemplary aspect of the invention, the method comprises, for each road segment of at least one road segment of the at least one road segment, determining a safety metric representative based on at least two selected representatives of: (i) the representative of a first metric associated with spatial properties associated with the respective road segment; (ii) a representative of the at least one representative of the second metric associated with at least one dynamic event associated with the respective road segment; and (iii) a representative of the at least one representative of the third metric associated with a speed associated with the respective road segment; wherein the method optionally comprises weighting at least one of the at least two selected representatives with a weighting factor before determining the safety metric.

According to a corresponding exemplary embodiment of the methods according to the first and second exemplary aspect of the invention, wherein said weighting factor represents a user-defined weighting factor.

According to a corresponding exemplary embodiment of the methods according to the first and second exemplary aspect of the invention, wherein the safety metric representative of a road segment of the at least one road segment is represented by a value within a predefined rage.

According to a corresponding exemplary embodiment of the methods according to the first and second exemplary aspect of the invention, comprising performing navigation, in particular of an autonomous vehicle, at least partially based on the provided safety data of the at least one road segment.

According to a corresponding exemplary embodiment of the method according to the second exemplary aspect of the invention, the method comprises receiving safety data associated with at least one road segment, said data comprising for each of the least one road segment: (i) a representative of a first metric associated with spatial properties associated with the respective road segment; (ii) at least one representative of a second metric associated with at least one dynamic event associated with the respective road segment; and (iii) at least one representative of a third metric associated with a speed associated with the respective road segment.

According to a fifth exemplary aspect of the invention a computer program code is disclosed, the computer program code when executed by a processor causing an apparatus to perform the actions of the method of any one of the methods of the first, second and third exemplary aspects of the invention.

According to an exemplary embodiment of the fifth exemplary aspect of the invention, furthermore a computer readable storage medium is disclosed, in which computer program code according to the fifth exemplary aspect of the invention is stored.

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 1 is a schematic block diagram of an example embodiment of any at least one apparatus according to the invention. Apparatus 100 comprises a processor 101 and, linked to processor 101, a memory 102. Memory 102 stores computer program code for holding available data associated with at least one road segment and for providing safety data. Processor 101 is configured to execute computer program code stored in memory 102 in order to cause an apparatus to perform desired actions. Memory 102 is thus an example embodiment of a non-transitory computer readable storage medium, in which computer program code according to the invention is stored.

Figure 1:
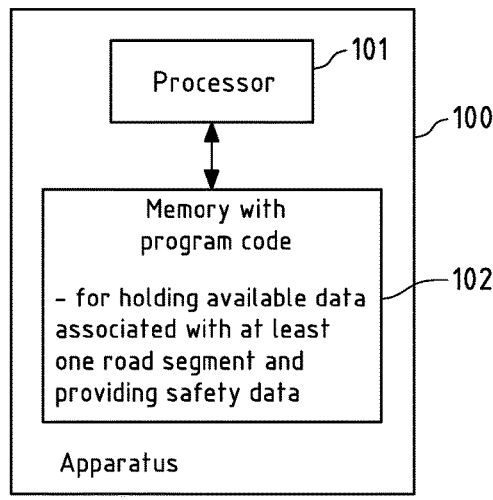
FIG. 1 is a schematic block diagram of an example embodiment of at least one apparatus according to the invention.

Apparatus 100 could be a server or any other kind of mobile or stationary device. If a plurality of apparatus are used, each apparatus may comprise a processor 101, and linked to processor 101, a memory 102, wherein memory 102 at least partially stores computer program code for holding available data associated with at least one road segment and for providing safety data. For instance, said plurality of apparatus may represent servers in a cloud interaction together in order to hold available data associated with at least one road segment and to providing safety data.

Apparatus 100 could equally be a component, like a chip, circuitry on a chip or a plug-in board, for any mobile or stationary device. Optionally, apparatus 100 could comprise various other components, like a data interface configured to enable an exchange of data with separate devices, a user interface like a touchscreen, a further memory, a further processor, etc.

An operation of at least one apparatus will now be described with reference to the flow chart of FIG. 2. The operation is an example embodiment of a method according to the invention. At least one processor 101 (may be one processor 101 ore a plurality of processors 101) and the program code stored in at least one memory 102 (may be one memory 102 or a plurality of memories 102) cause at least one apparatus (may be one apparatus ore a plurality of apparatuses) to perform the operation when the program code is retrieved from memory 102 and executed by processor 101. The at least one apparatus that is caused to perform the operation can be apparatus 100 or some other apparatus, for example but not necessarily a device comprising apparatus 100.

The at least one apparatus holds available data associated with each road segment of at least one road segment, said data comprising: (i) a representative of a first metric associated with spatial properties associated with the respective road segment; (ii) at least one representative of a second metric associated with at least one dynamic event associated with the respective road segment; and (iii) at least one representative of a third metric associated with a speed associated with the respective road segment (action 201).

The at least one road segment may represent a road segment that can be used for navigation purposes. For instance, a plurality of road segments of this at least one road segment may represent a part of map or a map that may be used for navigation, in particular for vehicle/car navigation, e.g. for autonomous vehicles (AV).

The representative of a first metric associated with spatial properties associated with a road segment of the at least one road segment may be indicative of spatial properties of the road segment that influences autonomous driving, e.g., how steep the road segment is, and/or how sinuous the road segment is, and/or the number of intersections on the road segment, and/or the number of lanes, etc. As an example, the representative of the first metric may be a value being indicative of the suitability of the road segment based on spatial properties associated with the road segment, e.g., the value may be a measure how easy or not the road segment can be driven based on the spatial properties associated with the road segment, i.e. the suitability represents the suitability how suitable the road segment is for driving the road segment. For instance, if a road segment is a perfect straight road it can be assumed that it is easy to drive for an autonomous driven vehicle (ADV) and thus the representative of a first metric may reflect this by an appropriate value. Or, as another example, if a road segment if steep, curvy (e.g., high sinuosity) it may be assumed that it is rough to drive for an ADV and thus the representative of a first metric may reflect this by an appropriate value.

A representative of the least one representative of a second metric associated with at least one dynamic event associated with the respective road segment may be indicative of a degree of uncertainty in safe driving, wherein the representative is based (e.g. may be determined) on the at least one dynamic event associated with the respective road segment. For instance, this at least one dynamic event may represent dynamic events in the road segment's environment that could impact autonomous driven vehicles. As an example, such a dynamic event may include weather, incidents, venues, pedestrians and other modes of transportation on the road segment. Thus, for instance, a representative of the second metric may be a value being indicative of the suitability for driving on the road segment based on the at least one dynamic event associated with the respective road segment.

As an example, if there are only low dynamic events with less surprise associated with a road segment, e.g., little or no pedestrians walking the road segment it can be assumed that it is easy to drive for an autonomous vehicle (AV) on this road segment and the representative of the second metric may reflect this by an appropriate value. Or, as another example, if there is at least one high dynamic event associated with a road segment, e.g., a densely populated road segment with many activities going on, like bikes, and/or pedestrians, and/or restaurants, or other dynamic events, it may be assumed that it is not so easy to drive for an AV on this road segment and thus the representative of the second metric may reflect this by an appropriate value.

For instance, a representative of the second metric associated with at least one dynamic event associated with a road segment may be indicative of a degree of uncertainty in safe driving of the respective road segment, since it could be assumed that dynamic effects may interfere with driving on the road segment.

By way of example, said at least one representative of a second metric associated with at least one dynamic event associated with the respective road segment may represent at least two representatives of a second metric, wherein each representative of these at least two representatives of a second metric represents a second metric associated with at least one dynamic event of the respective road segment is associated with one of a point in time and a period of time. Thus, it may be considered that dynamic events associated with a road segment may depend on the time. For instance, it could be assumed that the likelihood of pedestrians walking on the road segment is lower during night than during the day. These changes in the effect of dynamic events based on different point in times and/or different time periods, e.g. at different times/periods of times of a day or different times/periods of times of a week, can be considered by means of the at least two representatives of the second metric.

A representative of the at least one representative of a third metric associated with a speed associated with the respective road segment may be indicative of the suitability for driving on the road segment based on a speed associated with the respective segment. The speed associated with the respective segment may be determined based on or may represent an average speed of objects, e.g. vehicles or other objects, on this road segment, wherein this average speed may be considered to represent a historical average speed on the road segment. For instance, if the average speed of a road segment is low this may indicate that AV needs to be more careful in navigating on the road segment and thus the representative of the third metric may reflect this by an appropriate value. Or, as another example, if the average speed of road segment is high this may indicate that AV can easy navigate on the road segment and thereby achieve high speed, and thus the representative of the third metric may reflect this by an appropriate value. For instance, the value may be proportional or anti-proportional to the average speed.

By way of example, said at least one representative of a third metric associated with a speed associated with the respective road segment represents at least two representatives of a third metric, wherein each representative of these at least two representative of a third metric represents a third associated with a speed associated with the respective road segment is associated with one of a point in time and a period of time. For instance, an average speed associated with a road segment may vary at different point in times or periods of times, e.g. at different times/periods of times of a day or different times/periods of times of a week. This can be considered by means of the at least two representatives of the third metric.

The at least one apparatus moreover provides, for at least one road segment of the at least one road segment, safety data of the respective road segment at least partially based on the representative of the first metric, the at least one representative of the second metric and the at least one representative of the third metric associated with the respective road segment (action 202).

For instance, said safety data may be provided from the at least one apparatus, which might be considered to represent a server, to a mobile device in order to support navigation performed by said mobile device. As an example, said mobile device may be associated or may be part of a vehicle, wherein this vehicle may represent be an AV (autonomous vehicle).

Said safety data associated with a respective road segment of the at least one road segment may for instance comprise (i) the representative of a first metric associated with spatial properties associated with the respective road segment; and/or (ii) at least one representative of the at least one representative of a second metric associated with at least one dynamic event associated with the respective road segment; and/or (iii) at least one representative of the at least one representative of a third metric associated with a speed associated with the respective road segment.

In an example embodiment, the representative of a first metric associated with spatial properties is represented by a value $s_i$ within a predefined range, wherein optional index i may refer to the respect road segment. For instance, each of the at least one at least one representative of a second metric associated with at least one dynamic event associated with the respective road segment is represented by a value $d_i(t)$ within a predefined range, wherein optional index i may refer to the respect road segment and t is a representative of the point in time or period of time the value is associated with. Furthermore, as an example, each of the at least one representative of a third metric associated with a speed associated with the respective road segment is represented by a value $v_i(t)$ within a predefined range, wherein optional index i may refer to the respect road segment and t is a representative of the point in time or period of time the value is associated with.

For instance, the predefined range of value $s_i$ may be between $s_{start}$ and $s_{end}$, wherein $s_{end} > s_{start}$ holds.

As an example, value $s_{start}$ may indicate that road segment i has a very low suitability of driving regarding the spatial properties associated with the road segment, e.g. the road segment has a high sinuosity, and value $s_{end}$ may indicate that road segment i has a very high suitability of driving regarding the spatial properties associated with the road segment, e.g. the road segment is perfect straight and thus easy to drive. Under this assumption, a higher value of $s_i$ indicates that this road segment i has a better suitability for driving regarding the spatial properties associated with this road segment compared to a lower value $s_i$. Thus, for instance, the suitability of driving indicated by $s_i$ may be proportional to the value of $s_i$. As another example, value $s_{end}$ may indicate that road segment i has a very low suitability of driving regarding the spatial properties associated with the road segment, e.g. the road segment has a high sinuosity, and value $s_{end}$, may indicate that road segment i has a very high suitability of driving regarding the spatial properties associated with the road segment, e.g. the road segment is perfect straight and thus easy to drive. Under this assumption, a lower value of $s_i$ indicates that this road segment i has a better suitability for driving regarding the spatial properties associated with this road segment compared to a higher value $s_i$. Thus, for instance, the suitability of driving indicated by $s_i$ may be anti-proportional to the value of $s_i$.

For instance, the predefined range of value $d_i(t)$ may be between $d_{start}$ and $d_{end}$, wherein $d_{end} > d_{start}$ holds.

As an example, value $d_{start}$ indicate that road segment i has a very low suitability of driving regarding the at least one dynamic event associated with the road segment and value $d_{end}$ may indicate that road segment i has a very high suitability of driving regarding the at least one dynamic event associated with the road segment. Under this assumption, a higher value of $d_i(t)$ indicates that this road segment i has a better suitability for driving regarding the at least one dynamic event associated with this road segment compared to a lower value $d_i(t)$. Thus, for instance, the suitability of driving indicated by $d_i(t)$ may be proportional to the value of $d_i(t)$. As another example, value $d_{end}$ may indicate that road segment i has a very low suitability of driving regarding the at least one dynamic event associated with the road segment, and value $d_{start}$ may indicate that road segment i has a very high suitability of driving regarding the at least one dynamic event associated with the road segment. Under this assumption, a lower value of $d_i(t)$ indicates that this road segment i has a better suitability for driving regarding the spatial properties associated with this road segment compared to a higher value $d_i(t)$. Thus, for instance, the suitability of driving indicated by $d_i(t)$ may be anti-proportional to the value of $d_i(t)$.

For instance, the predefined range of value $v_i(t)$ may be between $v_{start}$ and $v_{end}$, wherein $v_{end} > v_{start}$ holds.

As an example, value $v_{start}$ may indicate that road segment i has a very low suitability of driving regarding the speed associated with the road segment and value $v_{end}$ may indicate that road segment i has a very high suitability of driving regarding the speed associated with the road segment. Under this assumption, a higher value of $v_i(t)$ indicates that this road segment i has a better suitability for driving regarding the at least one dynamic event associated with this road segment compared to a lower value $v_i(t)$. Thus, for instance, the suitability of driving indicated by $v_i(t)$ may be proportional to the value of $v_i(t)$. As another example, value $v_{end}$ may indicate that road segment i has a very low suitability of driving regarding the speed associated with the road segment, and value $v_{start}$ may indicate that road segment i has a very high suitability of driving regarding the speed associated with the road segment. Under this assumption, a lower value of $v_i(t)$ indicates that this road segment i has a better suitability for driving regarding the spatial properties associated with this road segment compared to a higher value $v_i(t)$. Thus, for instance, the suitability of driving indicated by $v_i(t)$ may be anti-proportional to the value of $v_i(t)$.

Furthermore, as an example, the predefined ranges associated with the first metric, the second metric and the third metric may define the same range, i.e., $s_{start} = d_{start} = v_{start}$ may hold and $s_{end} = d_{end} = v_{end}$ may hold.

Figure 3:
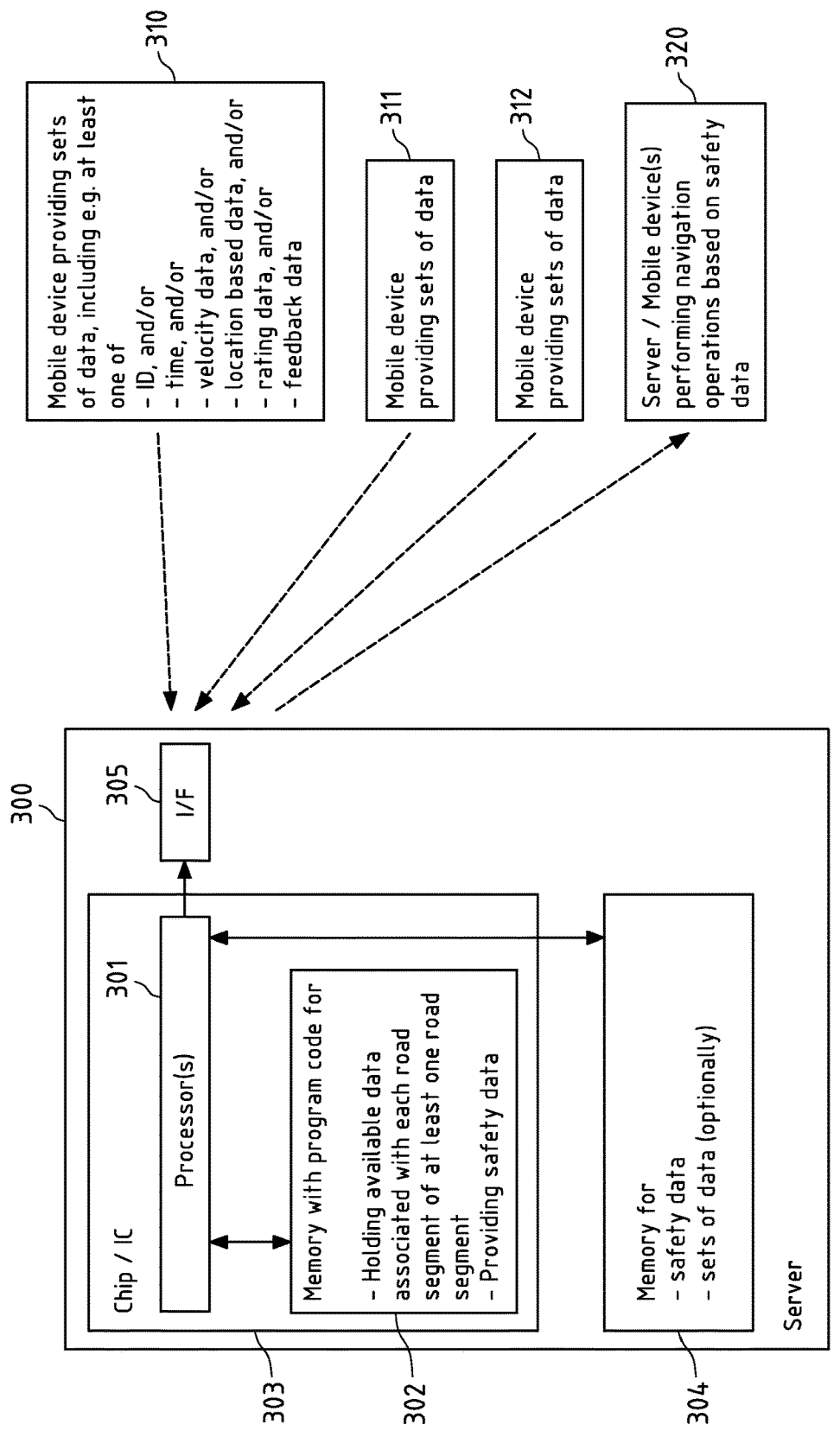
FIG. 3 is a schematic block diagram of an example embodiment of system comprising an example apparatus according to the invention.

FIG. 3 depicts a schematic block diagram of an example embodiment of system comprising an example apparatus according to the invention.

The system comprises a server 300, which may comprise the at least one apparatus 100 depicted in FIG. 1. Furthermore, the system comprises a plurality of mobile devices 310, 311, 312, 320.

Server 300 comprises a processor 301 that is linked to a first memory 302, to a second memory 304 and to a communication interface 305. Processor 301 is configured to execute computer program code, including computer program code stored in memory 302, in order to cause server 300 to perform desired actions.

Memory 302 stores computer program code for holding available data associated with each road segment of at least one road segment, said data comprising: (i) a representative of a first metric associated with spatial properties associated with the respective road segment; (ii) at least one representative of a second metric associated with at least one dynamic event associated with the respective road segment; and (iii) at least one representative of a third metric associated with a speed associated with the respective road segment, wherein this may correspond to action 201 depicted in FIG. 2. Furthermore, memory 302 stores computer program code for providing, for at least one road segment of the at least one road segment, safety data of the respective road segment at least partially based on the representative of the first metric, the at least one representative of the second metric and the at least one representative of the third metric associated with the respective road segment, wherein this may correspond to action 202 depicted in FIG. 2. The computer program code may comprise for example similar program code as memory 102. In addition, memory 302 could store computer program code configured to realize other functions. In addition, memory 302 could also store other kind of data.

Processor 301 and memory 302 may optionally belong to a chip or an integrated circuit 303, which may comprise in addition various other components, for instance a further processor or memory. It may comprise for instance a working memory for processor 301.

Memory 304 is configured to store data, for example, the data associated with at least one road segment, which is held available in action 201, may be stored in memory 304. Furthermore, memory 304 may be configured to store sets of data received from mobile devices 310, 311, 312, 320.

For instance, a mobile device 310, 311, 312, 320 may be for instance a mobile communication device, like a smart-phone, or a navigation device that is integrated in a vehicle (e.g. an AV), or any other mobile device. For instance, the at least one mobile device 310, 311, 312, 320 may move or may have moved on at least one road segment of the at least one road segment. A mobile device of the at least one mobile device 310, 311, 312, 320 may collect data and send at least one set of data to the server, wherein such a set of data may comprise at least one of: (i) an identifier (ID), (ii) timestamp (time), (iii) velocity data, (iv) location based data, (v) rating data, (vi) feedback data.

Said location based data may comprise information on the location and a timestamp indicating when the information on the location has been measured by the respective mobile device. The identifier (ID) may be configured to identify the respective mobile device that has sent this set of data. For instance, each set of data may be associated with a respective road segment of the at least one road segment, wherein this associated may be performed based on the location based data of set of data.

As an example, a mobile device 310, 311, 312, 320 may comprise a Global Satellite navigation system satellite (GNSS) receiver, for example based on signals received from GPS satellites, from BeiDou satellites, from GLONASS satellites or from Galileo satellites or other satellites, in order to estimate the location of the mobile device, or the mobile device may comprise another unit for estimating the location. For instance, such mobile devices may be associated with objects moving on a respective road segment, wherein said objects may comprise bikes, and/or pedestrians and/or vehicles and/or other objects that can move on the road segment.

For instance, said determining at least one representative of the at least one representative of a second metric associated with at least one dynamic event associated with the respective road segment may be performed by the server 300 at least partially based on at least one set of data associated with this road segment. More exemplary details will be provided with respect to method 600 depicted in FIG. 6.

For instance, said determining at least one representative of the at least one representative of a third metric associated with a speed associated with the respective road segment, may be performed by the server 300 at least partially based on at least one set of data associated with this road segment. More exemplary details will be provided with respect to method 700 depicted in FIG. 7.

Figure 2:
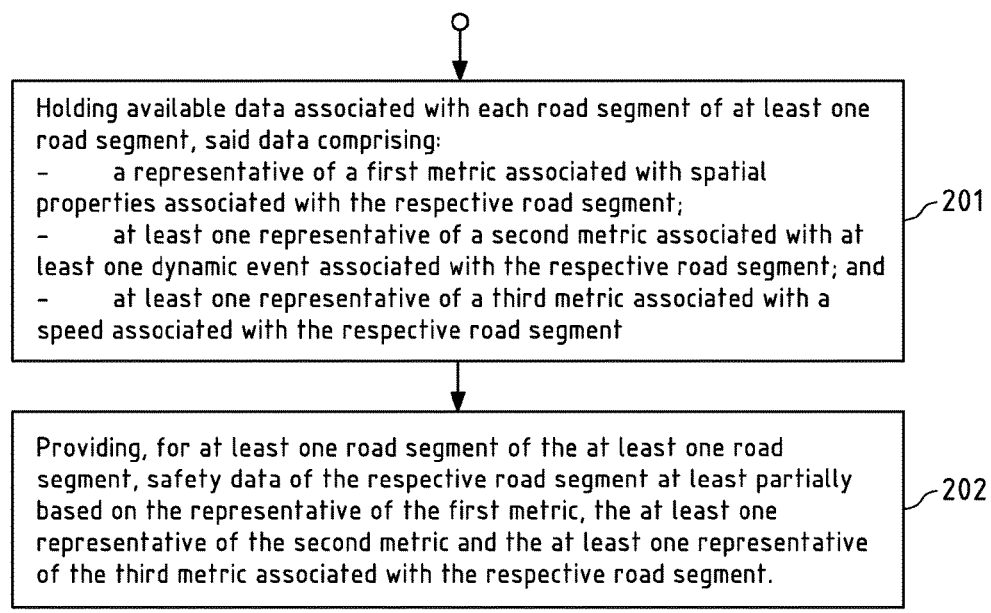
FIG. 2 is a flow chart illustrating an example operation in the at least one apparatus of FIG. 1.

Furthermore, said providing, for at least one road segment of the at least one road segment, safety data of the respective road segment at least partially based on the representative of the first metric, the at least one representative of the second metric and the at least one representative of the third metric associated with the respective road segment, wherein this may correspond to action 202 depicted in FIG. 2, may comprise transmitting this safety data from server 300 to another server 320 or mobile device 320 via the interface 305, wherein this transmission may be performed via the Internet and/or a wireless network and/or a wireline network.

As an example, this transmitting the safety data from server 300 to another server 320 or mobile device 320 may be performed based on push service, i.e., the server 300 may send safety data when there is an update regarding safety data associated with a respective road segment of the at least one road segment. Or, as another example, this transmission of the safety data associated with at least one road segment from server 300 to another server 320 or mobile device 320 may be performed based on pull service, wherein the mobile device or the other server may request safety data for at least one road segment of the at least one road segment. For instance, said push or pull service may be performed based on request-response communication system over a TCP/IP communication protocol. Furthermore, as an example, said transmitting the safety data from server 300 may be performed to one or more mobile devices 310, 311, 312, 320.

Based on this safety data received at the other server 320 or other mobile device 320, the other server 320 or other one or more mobile device 310, 311, 312, 320 may perform navigation operations. These navigation operations performed based on the safety data may be considered to represent a further aspect of the invention, and, in particular, a separate aspect of the invention, and may be performed as described with respect to method 1200 depicted in FIG. 12. Furthermore, it system 300 enables that data from different mobile device 320 can be aggregated and/or shared between the mobile devices 320. For instance, if a mobile device sends a new set of data regarding one or more road segments, this new set of data can be used for obtaining and providing a new safety data in action 202 which may be provided to mobile devices for performing a better navigation.

Thus, as an example, navigation strategies and methods of AVs on various road segments may be received at the at least one apparatus 100 or server 300 and may be stored, wherein navigation strategies of AV's that run into accidents may be stored (e.g. indicated by the representatives of the second metric) and strategies of AV's that have a smooth ride as well. For instance, the memory 303 and/or the memory 304 may be part of a cloud.

Figure 4A:
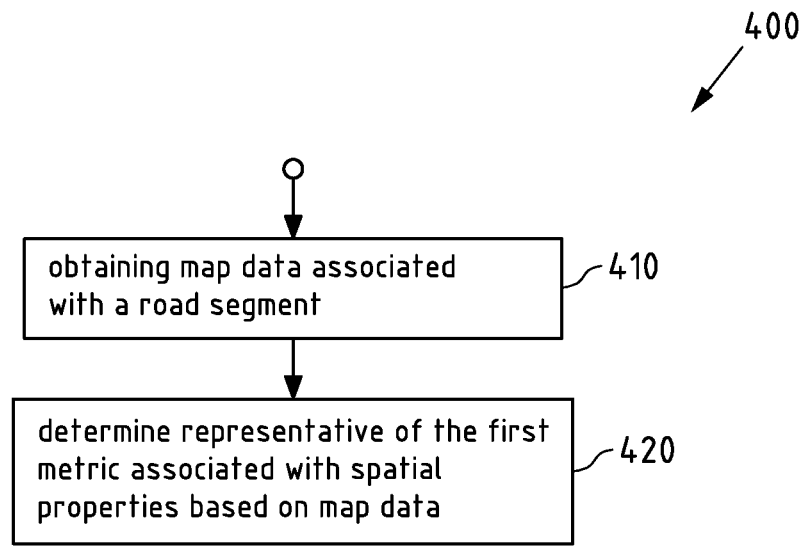
FIGS. 4a to 4b are flow charts illustrating example embodiment of methods according to the invention.

FIG. 4a depicts a flow chart illustrating an example embodiment of a method 400 according to the invention. This method 400 may be used to determine a representative of the first metric associated with spatial properties associated with a road segment of the at least one road segment. For instance, this method 400 may be performed for each road segment of the at least one road segment in order to determine a respective representative of the first metric associated with spatial properties associated with a road segment for each road segment of the at least one road segment. As an example, this method 400 may be performed by the at least one apparatus 100 or the server 300.

Map data associated with the respective road segment is obtained (action 410). This map data may for instance be stored in the memory 304 of the server 300, but can also be obtained from another server via the interface 305. This map data associated with respective road segment may comprise information regarding spatial properties of the road segment. For instance, this map data may comprise information regarding the sinuosity of the road segment, and/or information on how many intersections are associated with this road segment, and/or information on the number of lines that are associated with this road segment, and/or information being descriptive on how steep the road segment is, and/or any other suited spatial information that may be of interested regarding the assessment whether the road segment is suitable for driving or not.

Based on this map data a representative of the first metric associated with spatial properties is determined (action 420). Thus, it may be assessed whether the spatial properties of this map data indicate that the road segment is more suitable for being driven by an AV or less suitable for being driven by an AV and, based on this assessment, the representative of the first metric $s_i$ is determined such that the representative of the first metric $s_i$ indicates that the road segment i has a corresponding suitability of driving regarding the spatial properties associated with the road segment.

For instance, if the number of intersections of the road segment is high the suitability of driving may be decreased and if the number of intersections is low the suitability of driving may be increased. And/or, for instance, if the number of lines of the road segment is high the suitability of driving may be decreased and if the number of lines is low the suitability of driving may be increased. And/or, for instance, if the sinuosity of the road segment is high the suitability of driving may be decreased and if the sinuosity is low the suitability of driving may be increased. And/or, for instance, if the road is steep the suitability of driving may be decreased and if the road is not steep the suitability of driving may be increased.

As an example, a look-up table may be used in order to determine the representative of the first metric based on the map data, wherein different representatives of the first metric are stored in the look-up table with respect to different combinations of the map data.

Thus, according to this example embodiment of a method 400 a representative of the first metric associated with spatial properties associated with a road segment of the at least one road segment is determined based on map-data associated with the respective road segment.

Figure 4B:
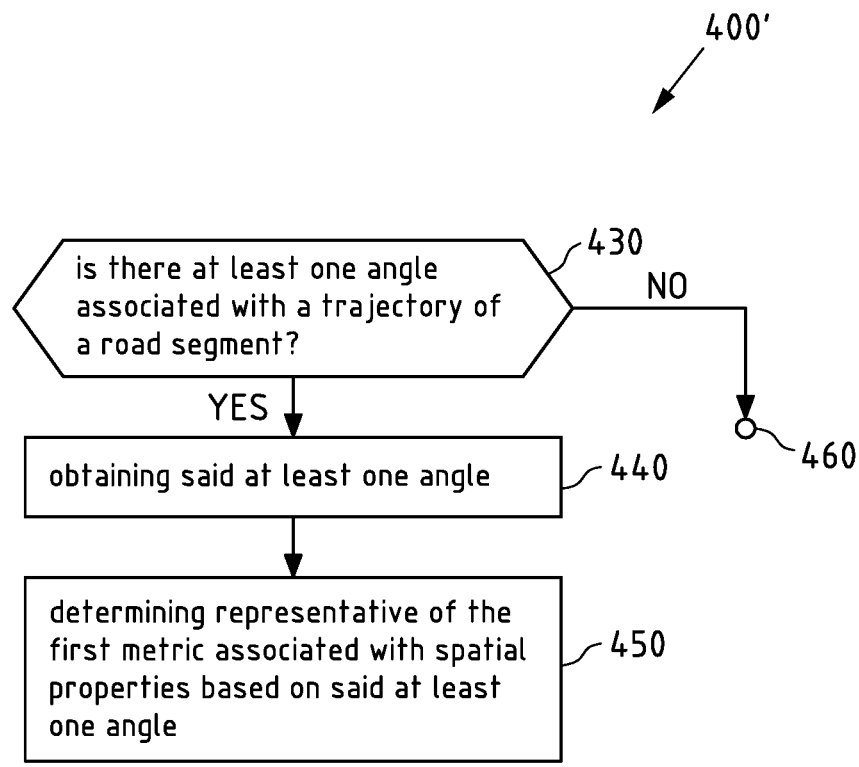

FIG. 4b depicts a flow chart illustrating an example embodiment of a method 400' according to the invention. This method 400' may be used to determine a representative of the first metric associated with spatial properties associated with a road segment of the at least one road segment and, as an example it may be used for implementing action 420 of method 400 depicted in FIG. 4a. As an example, this method 400' may be performed by the at least one apparatus 100 or the server 300.

Figure 5A:
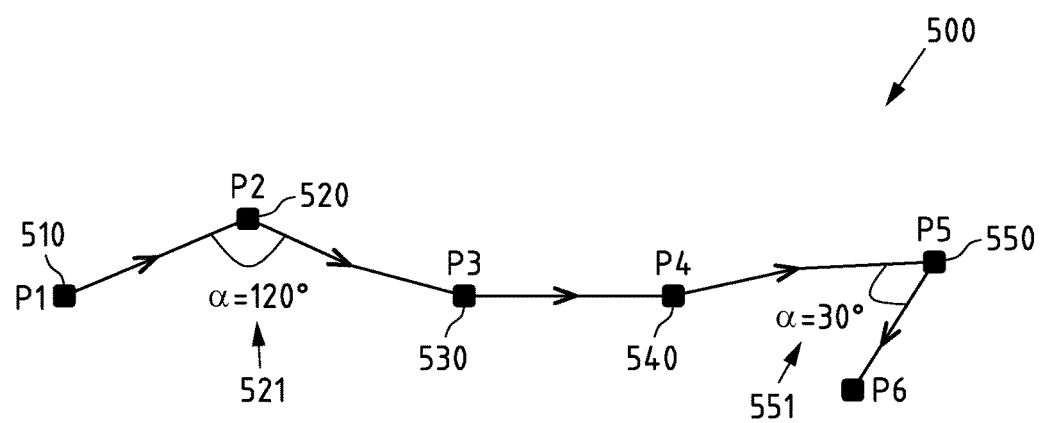
FIGS. 5a to 5b are schematic illustrations of road segments.
Figure 5B:
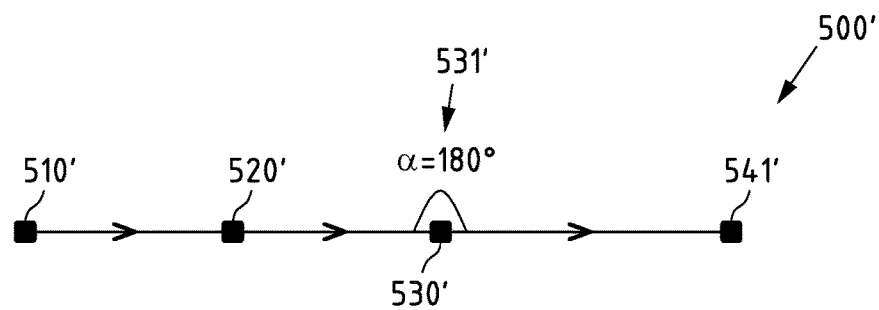

FIGS. 5a and 5b depict different examples of road segments 500 and 500' in a two-dimensional projection, wherein each road segment 500 and 500' shows a specific trajectory. For instance, such a trajectory may comprise at least one angle 521, 531, 541, 551, 521', 531', wherein an angle may represent the inside-angle between or associated with a shape point 520, 530, 541, 551, 521', 531'. The angle may represent the inside-angle between two links associated with a shape point of the trajectory. For instance, a first link may represent the connection between the shape point 520 and an adjacent shape point 510 (being adjacent to the shape point 520) of the trajectory of the road segment 500 and the a second link may represent the connection between the shape point 520 and another adjacent shape 530 being adjacent to the shape point 520, wherein the angle 521 may represent the inside-angle (e.g. considered to represent a bending angle) between the first and second link, as indicated by angle α (521) in FIG. 5a. Furthermore, as an alternative, the angle may represent the outside-angle between the first and second link (not depicted in FIGS. 5a and 5b).

It may be checked whether there is at least one angle associated with a trajectory of the road segment 500, 500' (action 430). If checking yields in positive result said at least one angle is obtained (action 440). For instance, it may be determined based on the map data associated with the respective road segment. Then, a representative of the first metric associated with spatial properties is determined based on said at least one angle. Each angle of this at least one angle may be considered to represent a measure of sinuosity of a part of the road segment.

For instance, said determining of a representative of a first metric $s_i$ based on said at least one angle may be performed based on applying a cosine-function or a sine-function to each angle of the at least one angle. As an example, if there a n angles $\alpha_j$ associated with a trajectory of the road segment, wherein n represents an integer value being n=1 or n being more than 1, a representative of a first metric $s_i$ may be determined based on the following metric:

$$m = \frac{\sum_{j=1}^{n}\left|\cos\left(\frac{\alpha_j}{2}\right)\right|}{n}$$

This metric m may be weighted by an optional weighting factor.

The metric m may represent a sinuosity metric which may help to measure how curvy the entire trajectory of the road segment is. For instance, if the road segment is a perfect straight line, then m=0, hence S>0 may indicates the proportion of how many sharp turning angles along the driven path. For instance, if an angle is 180°, as exemplarily depicted in FIG. 5b by means of angle 531', the corresponding cosine-function in metric m is cos(180°/2)=0 and thus sinuosity of metric m is not increased.

As an example, said representative of a first metric $s_i$ may be proportional to this metric m, e.g. $s_i$=m may hold, or said representative of a first metric $s_i$ may be anti-proportional to this metric. For instance, in case an increasing value of the representative of a first metric indicates a decreasing suitability of driving the first metric $s_i$ may be proportional to this metric m, and, vice versa, in case a decreasing value of the representative of a first metric indicates an increasing suitability of driving the first metric $s_i$ may be anti-proportional to this metric.

For instance, the spatial properties associated with the respective road segment represent two-dimensional properties.

As another example the spatial properties associated with the respective road segment may represent three-dimensional properties, wherein said map data associated with the respective road segment may comprise information being descriptive on how steep the road segment is and/or information on how incline changes. For instance, said information being descriptive on how steep the road segment and/or on how incline changes is may comprise at least one angle of elevation, wherein said at least one angle may considered as an angle associated with a trajectory of a road segment checked in action 430, obtained in action 440 and used for determining a representation of the first metric in action 450. Thus, in this example, the n angles $\alpha_j$ associated with a trajectory may comprise one or more angles obtained in a two-dimensional projection of the respective road segment and may comprise one or more angles of elevation of the respective road segment, and then, metric m may represent a three-dimensional measure of sinuosity of the respective road segment.

Furthermore, the metric m may serve as a basis value of the representative of a first metric $s_i$, wherein this basis value may be corrected based on further map data associated with respective road segment, e.g. further based on at least one of (i) information on how many intersections are associated with this road segment, (ii) information on the number of lines that are associated with this road segment, (iii) information being descriptive on how steep the road segment as, and (iv) any other suited spatial information that may be of interested regarding the assessment whether the road segment is suitable for driving or not.

It has to be understood that other mathematical representations may be applied for metric m.

If there is no angle associated with a trajectory of a road segment the method 400' might proceed at reference number 460 and, as an example, the representative of a first metric $s_i$ may be set to $s_{end}$ in case an increasing value of the representative of a first metric indicates a decreasing suitability of driving or the representative of a first metric $s_i$ may be set to $s_{start}$ in case a decreasing value of the representative of a first metric indicates an increasing suitability of driving.

Figure 6:
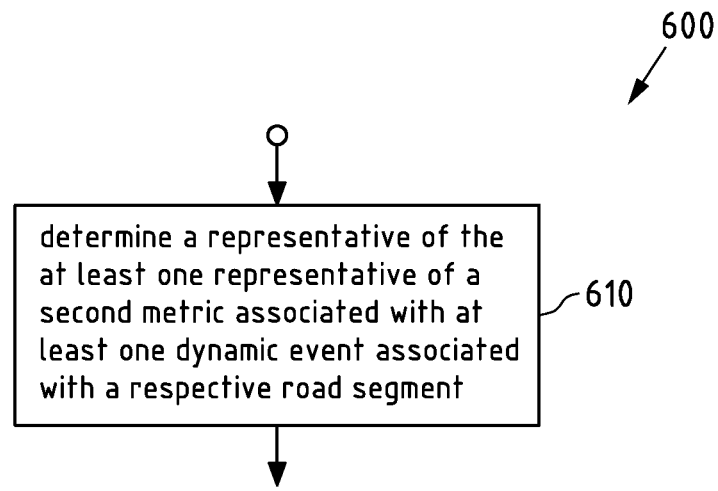
FIG. 6 is a flow chart illustrating an example embodiment of a method according to the invention.

FIG. 6 depicts a flow chart illustrating an example embodiment of a method 600 according to the invention. This method 600 may be, used to determine a representative of the at least one representative of the second metric associated with at least one dynamic event associated with a road segment of the at least one road segment. For instance, this method 600 may be performed for each road segment of the at least one road segment in order to determine a respective representative of the second metric associated with at least one dynamic event associated with a road segment of the at least one road segment. Furthermore, as an example, this method 600 may be performed several times with respect to the same road segment in order to determine at least two representatives of a second metric associated with this road segment, wherein each of the at least two representatives is associated with one of a point in time and a period of time, wherein the point in times/periods of times differ from each other.

A representative $d_i(t)$ of the at least one representative of the second metric associated with at least one dynamic event associated with a respective road segment i of the at least one road segment is determined (action 610).

According to an example of an embodiment, the representative $d_i(t)$ may be determined to be inversely proportional to an estimated impact of the at least one dynamic event with respect to driving on the road segment i. Then, an increasing value of the representative of the second metric $d_i(t)$ indicates a decreasing suitability of driving. Thus, as an example, if there is no impact of a dynamic event associated with the road segment (e.g., at the point in time or time period t) the representative of the second metric $d_i(t)$ may be set to $d_i(t)=d_{end}$, and if the impact of the at least one dynamic event on driving on the respective road is very high (e.g., at the point in time or time period t), the representative of the second metric $d_i(t)$ may be set to $d_i(t)=d_{start}$.

According to another example of an embodiment, the representative $d_i(t)$ may be determined to be proportional to an estimated impact of the at least one dynamic event with respect to driving on the road segment i. Then, a decreasing value of the representative of the second metric $d_i(t)$ indicates an increasing suitability of driving. Thus, as an example, if there is no impact of a dynamic event associated with the road segment (e.g., at the point in time or time period t) the representative of the second metric $d_i(t)$ may be set to $d_i(t)=d_{start}$, and if the impact of the at least one dynamic event on driving on the respective road is very high (e.g., at the point in time or time period t), the representative of the second metric $d_i(t)$ may be set to $d_i(t)=d_{end}$.

According to an example of an embodiment, a representative $d_i(t)$ of the least one representative of the second metric associated with at least one dynamic event associated with a respective road segment i may be determined based on location based data associated with the respective road segment in action 610. Thus, the at least one dynamical event associated with the respective road segment i may comprise at least movement of objects on the road segment i, as will be explained in the sequel.

For instance, said location based data may be received at the at least one apparatus 100 or the server 300 or any other apparatus from at least one mobile device 310, 311, 312, 320, wherein the at least one mobile device 310, 311, 312, 320 moves or moved on the respective road segment of the at least one road segment. For instance, said location based data may comprise information on the location and a timestamp indicating when the information on the location has been measured by the respective mobile device. This location based data may be part of the set of data transmitted from a mobile device 310, 311, 312, 320 to server 300 as exemplarily depicted in FIG. 3 or transmitted to the at least one apparatus 100. Furthermore, a set of data may comprise an identifier (ID) identifying the respective mobile device that has send this set of data.

As an example, a mobile device 310, 311, 312, 320 may comprise a Global Satellite navigation system satellite (GNSS) receiver, for example based on signals received from GPS satellites, from BeiDou satellites, from GLO-NASS satellites or from Galileo satellites or other satellites, in order to estimate the location of the mobile device, or the mobile device may comprise another unit for estimating the location. For instance, such mobile devices may be associated with objects moving on a respective road segment, wherein said objects may comprise bikes, pedestrians and, as a further example, other objects that can move on the road segment (which may include vehicles).

Thus, the at least one apparatus 100 or the server 300 may collect location based data from different mobile devices moving on different road segments of the at least one road segment.

For instance, method 600 may comprise classifying the collected location based data into different object classes, i.e., location based data being identified to be generated by a mobile device of a pedestrian may be associated with the object class "pedestrian", and location based data being identified to be generated by a mobile device of a bicycle may be associated with the object class "bicycle", and, as a further example, location based data being identified to be generated by a mobile device of a car may be associated with the object class "car". As an example, said classification may be performed based on an identifier transmitted by the respective mobile device, wherein the identifier may for instance be indicative of the object associated with the respective mobile device. Or, as another example, a probe-trajectory may be obtained at the at least one apparatus 100 or server 300 based on location based data received from the same mobile device and a procedure may be performed by the at least one apparatus 100 or server 300 in order to estimate whether the mobile device is associated with a pedestrian or a bicycle, or, as a further example, with a car.

Then, at least partially based on this collected location based data it can be determined in action 610 whether a road segment i of the at least one road segment is highly populated or less populated at a selected point in time or period of time t. For instance, this may comprise neglecting those location based data which is associated with the object class "car", and, as a further example, location based data associated with the object class "bicycle" and/or "pedestrian" may be considered to determine a degree of population on this road segment i since the movement of pedestrians and bicycle on a road segment may have huge impact for cars driving on this road segment. Thus, if the road segment is highly populated this may have a high impact on driving on the road segment and thus the representative $d_i(t)$ may be determined accordingly in action 610 in order to indicate that this road segment is not very well suited for driving with respect to the criterion at least one dynamic event. For instance, the higher the number of location based data of pedestrian and/or bikes associated with a respective road segment, the higher the dynamics of such road segment and the higher the potential chances of accidents/mistakes in AVD and, thus, the lower the suitability of driving indicated by the representative $d_i(t)$ of the at least one representative of the second metric associated with at least one dynamic event associated with a respective road segment i of the at least one road segment is.

According to an example, a representative $d_i(t)$ of the least one representative of the second metric associated with at least one dynamic event associated with a respective road segment i may be determined based an incident and/or accident data associated with this road segment i in action 610. For instance, this incident and/or accident data may represent historical incident and/or accident data for road segments of the at least one road segment which might be collected by the at least one apparatus 100 or the server 300, wherein incident and/or accident data associated with a respective road segment i may be used to ascertain a safety metric of this road segment, and wherein that safety metric is used to determine the representative $d_i(t)$ of the least one representative of the second metric associated with at least one dynamic event associated with a respective road segment i. Thus, as an example, if the incident and/or accident data is indicative of a huge number of incidents and/or accidents with respect to a road segment i, this may lead to a representative $d_i(t)$ indicating a lower or low suitability of driving. Or, as another example, if the incident and/or accident data is indicative of only a low number of incidents and/or accidents or no incidents and/or accidents with respect to a road segment i, this may lead to a representative $d_i(t)$ indicating a higher or high suitability of driving.

According to an example, a representative $d_i(t)$ of the least one representative of the second metric associated with at least one dynamic event associated with a respective road segment i may be determined based on rating data associated with the respective road segment. For instance, said rating data may be provided by a mobile device 310, 311, 312, 313, 320 when or after moving along a road segment, wherein the rating data may indicate how dynamic the respective road segment is, e.g. by means of a rating score. This rating data may further comprise a time stamp and may be associated with or may comprise location data or any other information which can be used to identify the respect road segment.

As an example, one or more cars (which may represent AV cars) may comprise such a mobile device 310, 311, 312, 313 and 320 may further comprise at least one sensor configured to be used for measuring how dynamic the environment is. Thus, based on information provided from this sensor a processor of the respective car may determine an appropriate rating data being indicative on how dynamic the respective road segment is. For instance, this at least one sensor may comprise at least one camera which can be used to detect a bike and/or a pedestrian and/or an event center point of interest and/or traffic stoplights and/or other events associated with a road segment of the at least one road segment. All this detected data may be used by the processor of the car to score how dynamic the road segment is and then may determine a rating data, which might represent a rating value, which can be transmitted to the at least one apparatus 100 or server 300 in order to be used for determining the representative $d_i(t)$ of the least one representative of the second metric associated with at least one dynamic event associated with the respective road segment i. Thus, the rating data may represent rata data based on sensor data obtained by or detected by using the at least one sensor of a car.

For instance, said at least one sensor may provide a confidence metric on how well the environment was sensed. This confidence metric may be considered when determining the rating data, wherein, for instance, any reduction in sensing confidence may result in a rating data indicating higher dynamic. As another example, said confidence metric may be sent as part of the set of data from the mobile device 310, 311, 312, 313 and 320 to the at least one apparatus 100 or server 300. Then, as an example, said confidence metric associated with the respective road segment may be used, e.g. by the at least one apparatus 100 or server 300 or by a mobile device performing navigation, for further processing, wherein any reduction in sensing confidence may result in a potential danger of the system. Thus, for instance, if a sensing confidence associated with a sensor is below a confidence threshold, the sensor data and/or rating data determined based on this sensor data may be neglected, e.g. by the mobile device 310, 311, 312, 313 and 320 comprising this sensor, or e.g. by the at least one apparatus 100 or the server 300. Or, as another example, a representative of the second metric of a road segment may be associated with confidence metric which is indicative of the confidence of the representative of the second metric. For instance, this confidence metric which is indicative of the confidence of the representative of the second metric may be determined, e.g. by the at least one apparatus 100 or the server 300, based on confidence metric provided by at least one sensor. Furthermore, said safety data may comprise a confidence metric which is indicative of the confidence of the representative of the second metric. For instance, in action 202 depicted in FIG. 2, this confidence metric associated with a representative of the second metric of a road segment may be provided as part of the safety data together with the representative of the second metric of the road segment, wherein this may be performed for the one or more road segments.

Furthermore, as another example, the rating data may comprise feedback data generated by the car, which represents an AV, which has sent the rating data, wherein the feedback data in indicative on how easily navigable the AV found a particular road segment. For instance, this feedback data may not depend on the above mentioned sensor data. This might capture road segments that might not necessarily have a lot of pedestrians or bikes but still complex to navigate; e.g. a 4-way or 5-way stop-sign intersections, train stoplights, tolls, traffic congestions, crazy drivers. Thus, this feedback data may be considered as a smooth-drive rating from the AV itself. For instance, if the AV had an accident the feedback data may be extremely negative, and, if it's a perfect smooth ride on a respective road segment, the feedback data may be highly positive. This feedback data from one or more AV may be used for determining the representative $d_i(t)$ of the least one representative of the second metric associated with at least one dynamic event associated with the respective road segment i.

As an example, the rating data sent by a car may comprise a rating value obtained by or based on the at least one sensor of the car and/or feedback data of the car.

Furthermore, it has to be understood that the representative $d_i(t)$ of the least one representative of the second metric associated with at least one dynamic event associated with a respective road segment i determined at action 610 may be determined on at least one of: (i) location data associated with the respective road segment i, (ii) accident and/or incident data associated with the respective road segment i, and (iii) rating data associated with the respective road segment i.

Figure 7:
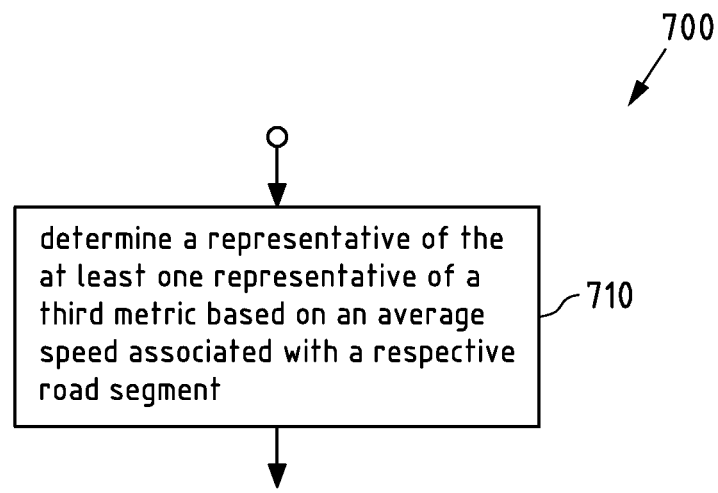
FIG. 7 is a flow chart illustrating an example embodiment of a method according to the invention.

FIG. 7 depicts a flow chart illustrating an example embodiment of a method 700 according to the invention. This method 700 may be used to determine a representative of the at least one representative of the third metric associated with a speed associated with a road segment of the at least one road segment. For instance, this method 700 may be performed for each road segment of the at least one road segment in order to determine a respective representative of the third metric associated with a speed associated with a road segment of the at least one road segment. Furthermore, as an example, this method 700 may be performed several times with respect to the same road segment in order to determine at least two representatives of a second metric associated with this road segment, wherein each of the at least two representatives is associated with one of a point in time and a period of time, wherein the point in times/periods of times differ from each other. Method 700 may be performed by the at least one apparatus 100 or the server 300.

The speed associated with the respective segment may be determined based on or may represent an average speed of objects, e.g. vehicles or other objects, on this road segment, wherein this average speed may be considered to represent a historical average speed on the road segment. For instance, if the average speed of a road segment is low this may indicate that AV needs to be more careful in navigating on the road segment and thus the representative of the third metric may reflect this by an appropriate value. Or, as another example, if the average speed of road segment is high this may indicate that AV can easy navigate on the road segment and thereby achieve high speed, and thus the representative of the third metric may reflect this by an appropriate value. For instance, the value may be proportional or inverse proportional to the average speed.

According to an example of an embodiment, the representative $v_i(t)$ may be determined to be proportional to a the speed associated with the road segment i. Then, an increasing value of the representative of the third metric $v_i(t)$ indicates an increasing suitability of driving. Furthermore, as an example, if the speed exceeds a first threshold the representative of the third metric $v_i(t)$ may be set to $v_i(t) = v_{end}$, and, optionally, if speed is equal or below a second threshold the representative of the third metric $v_i(t)$ may be set to $v_i(t) = v_{start}$, wherein the second threshold is lower than the first threshold, and wherein the second threshold may be zero speed.

According to an example of an embodiment, the representative $v_i(t)$ may be determined to be inverse proportional to a the speed associated with the road segment i. Then, a decreasing value of the representative of the third metric $v_i(t)$ indicates an increasing suitability of driving. Furthermore, as an example, if the speed exceeds a first threshold the representative of the third metric $v_i(t)$ may be set to $v_i(t) = v_{start}$, and, optionally, if speed is equal or below a second threshold the representative of the third metric $v_i(t)$ may be set to $v_i(t) = v_{end}$, wherein the second threshold is lower than the first threshold, and wherein the second threshold may be zero speed.

For instance, said average speed associated with a road segment of the at least one road segment may be determined based on several speed values, wherein each speed value may be determined based on the movement of an object (e.g. a car) moving on the road segment, and wherein this movement may be associated with one of a point in time and a period of time. Then, as an example, a mean value may be determined based on these several speed values and the mean value may represent the average speed associated with the road segment, and, optionally, associated with one of the point in time and the period of time. For instance, the mean value may represent the arithmetic mean.

As an example, said speed associated with a road segment, wherein said speed may represent an average speed, may be determined based on location based data.

For instance, said location based data may at least partially represent the location based data described with respect to method 600 depicted in FIG. 6. For instance, said location based data may be received at the at least one apparatus 100 or the server 300 or any other apparatus from at least one mobile device 310, 311, 312, 320, wherein the at least one mobile device 310, 311, 312, 320 moves or moved on the respective road segment of the at least one road segment. For instance, said location based data may comprise information on the location and, optionally, a timestamp indicating when the information on the location has been measured by the respective mobile device. This location based data may be part of the set of data transmitted from a mobile device 310, 311, 312, 320 to server 300 as exemplarily depicted in FIG. 3 or transmitted to the at least one apparatus 100. Furthermore, a set of data may comprise an identifier (ID) identifying the respective mobile device that has send this set of data. For instance, based on this location based data the at least one apparatus 100 or the server 300 may estimate an average speed value of an object associated with the mobile device 310, 311, 312, 320 associated with the location based data. Then, a plurality of location based data received from different mobile devices 311, 311, 312, 320, wherein each mobile device of the different mobile devices is associated or may be part of a different object, can be used by the at least one apparatus 100 or the server 300 in order to determine a plurality of speed values, wherein each of the speed values is associated with a different object and may represent an average speed value. Based on this plurality of speed values the average speed associated with this road segment may be determined and the representative of the third metric $v_i(t)$ may be determined in action 710.

Or, as another example, said speed associated with a road segment, wherein said speed may represent an average speed, may be determined based on velocity data, wherein this velocity data may be received at the at least one apparatus 100 or the server 300 or any other apparatus from at least one mobile device 310, 311, 312, 320, wherein the at least one mobile device 310, 311, 312, 320 moves or moved on the respective road segment of the at least one road segment. For instance, said velocity data may comprise information on the actual velocity and, optionally, a timestamp indicating when the velocity has been measured by the respective mobile device. For instance, based on this velocity data the at least one apparatus 100 or the server 300 may estimate an average speed value of an object associated with the mobile device 310, 311, 312, 320 associated with the location based data. Then, a plurality of velocity data received from different mobile devices 311, 311, 312, 320, wherein each mobile device of the different mobile devices is associated or may be part of a different object, can be used by the at least one apparatus 100 or the server 300 in order to determine a plurality of speed values, wherein each of the speed values is associated with a different object and may represent an average speed value. Based on this plurality of speed values the average speed associated with this road segment may be determined and the representative of the third metric $v_i(t)$ may be determined in action 710.

For instance, a representative of the third metric of a road segment may be associated with confidence metric which is indicative of the confidence of the representative of the third metric. As an example, the confidence metric may depend on how may location based data has been used to determine the average speed associated with a respective road segment, e.g., how many sets of data have been received from the least one mobile device 310, 311, 312, 320. A high number of location data, e.g. a high number of GPS probes, used for determining the average speed of a road segment may result in a high confidence metric which indicates that the representative of the third metric of this road segment has a high confidence, and a low number of location data, e.g. a low number GPS probes, used for determining the average speed of a road segment may result in a low confidence metric which indicates the representative of the third metric of this road segment has a low confidence. For instance, in action 202 depicted in FIG. 2, this confidence metric associated with a representative of the third metric of a road segment may be provided as part of the safety data together with the representative of the third metric of the road segment, wherein this may be performed for the one or more road segments.

Figure 8:
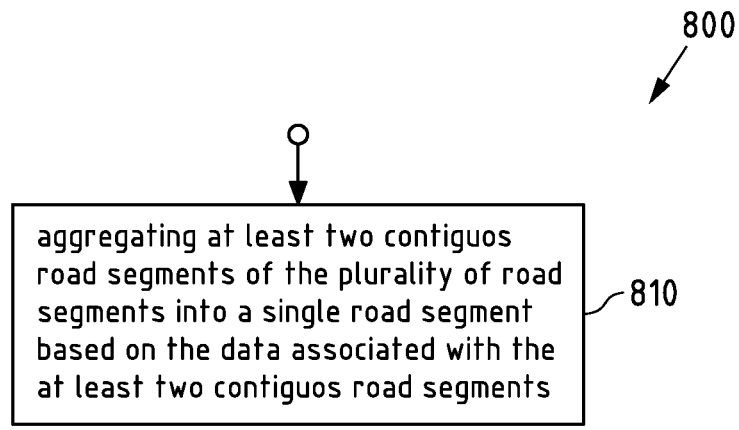
FIG. 8 is a flow chart illustrating an example embodiment of a method according to the invention.

FIG. 8 depicts a flow chart illustrating an example embodiment of a method 800 according to the invention. Method 800 may be performed by the at least one apparatus 100 or the server 300.

It is assumed that the at least one road segment represents a plurality of road segments.

This method 800 may be used to aggregate at least two contiguous road segments of the plurality of road segments into a single road segment based (e.g. at least partially) on the data associated with the at least two contiguous road segments (action 810).

Two road segments may be considered to be contiguous if they are directly connected to each other, i.e., without any further road segment between the two road segment.

The data associated with the at least two contiguous road segments may comprise for each of the at least two contiguous road segments: (i) the representative of a first metric associated with spatial properties associated with the respective road segment; (ii) a representative of the at least one representative of a second metric associated with at least one dynamic event associated with the respective road segment; and (iii) a representative of the at least one representative of a third metric associated with a speed associated with the respective road segment.

For instance, the representative of the at least one representative of a second metric associated with at least one dynamic event associated with the respective road segment and the representative of the at least one representative of a third metric associated with a speed associated with the respective road segment may be associated with the same point in time or the same period of time. Thus, said data may comprise for each road segment i of the at least two contiguous road segments the representative of a first metrics $s_i$, the representative $d_i(t)$ of the at least one representative of a second metric and the representative $v_i(t)$ of the at least one representative of a third metric.

Said aggregating is performed in a way that representatives of the at least two contiguous road segments are within in a similarity measure.

As an example, said aggregating is only performed if the representatives $s_i$, $d_i(t)$, $v_i(t)$ associated with the at least two contiguous road segments fulfil such a similarity measure. For instance, the representatives $s_i$ of the first metric associated with the at least two contiguous road segments must fulfil a first similarity criterion of the similarity measure, and the representatives $d_i(t)$ of the second metric associated with the at least two contiguous road segments must fulfil a second similarity criterion of the similarity measure, and the representatives $v_i(t)$ of the third metric associated with the at least two contiguous road segments must fulfil a second similarity criterion of the similarity measure. Thus, it may be ensured that the safety aspect of each of the first metric, the second metric and the third metric of the at least two contiguous road segments is conserved when these at least two contiguous road segments are aggregated into a single road segment and it may be avoided that a very good similarity of representatives of a first metric compensates for deviations of the other metrics. Accordingly, similarity may be ensured between the representatives of the first metric of the at least two contiguous road segments, and similarity may be ensured between the representatives of the second metric of the at least two contiguous road segments, and similarity may be ensured between the representatives of the third metric of the at least two contiguous road segments.

As an example embodiment, said similarity measure is a predefined distance which is determined based on representatives of a first road segment and a second road segments of the at least two contiguous segments based on at least one of: (i) a first difference or ratio between a representative of a first metric associated with spatial properties associated with the first road segment and a representative of a first metric associated with spatial properties associated with the second road segment; (ii) a second difference or ratio between a representative of a second metric associated with at least one dynamic event associated with the first road segment and a representative of a second metric associated with at least one dynamic event associated with the second road segment; and (iii) a third difference or ratio between a representative of a third metric associated with a speed associated with the first road segment and a representative of a third metric associated with a speed associated with the second road segment.

For instance, said similarity measure is fulfilled of the absolute value of the first difference does not exceed a first threshold, and the absolute value of the second difference does not exceed a second threshold, and the absolute value of the third difference does not exceed a third threshold, wherein the first, second and third threshold may be the same. Otherwise the similarity measure may be considered not to be fulfilled and thus the first and second road segments are not allowed to be aggregated. If the similarity measure is considered to be fulfilled, the first and second road segments may be considered to be allowed to be aggregated to a single road segment.

As a non-limiting example, said similarity metric may be based on a chebyshev distance function. For instance, the similarity metric of two road segments i and j (e.g. at a point in time t or period of time t) may be defined as:

$$\text{chebyshev}((s_i(t),d_i(t),v_i(t),(s_j(t),d_j(t),v_j(t))=\max\{abs(s_i(t)-s_j(t)),abs(d_i(t)-d_j(t)),abs(v_i(t)-v_j(t))\}$$

For instance if the maximum value of the absolute value $abs(s_i(t)-s_j(t))$, the absolute value $abs(d_i(t)-d_j(t))$ and the absolute value $abs(v_i(t)-v_j(t))$ does not exceed a threshold, the similarity measure may be assumed to be fulfilled, otherwise the similarity measure may be assumed not to be fulfilled.

It has to be understood that other similarity measures may be applied.

Thus, for instance, road segments in which a uniform navigation strategy may be used can be aggregated into a single road segment. E.g., once a single road segment has been determined based on aggregating at least two contiguous road segments, this single road segment can be shared from at least one apparatus 100 or server 300 to at least one mobile device 310, 311, 312, 320.

According to an example embodiment, data associated with the single road segment may be determined, wherein the single road segment has been generated based on aggregating the at least two contiguous road segments, e.g. as described above, wherein this data associated with the single road segment is determined based on the data associated with the at least two contiguous road segments. For instance, this determining data associated with the single road segment may be performed by action 960 depicted in FIG. 9.

This data associated with the single road segment comprises:
  a representative of a first metric associated with spatial properties associated with the single road segment;
  at least one representative of a second metric associated with at least one dynamic event associated with the single road segment; and
  at least one representative of a third metric associated with a speed associated with the single road segment;

wherein this data may be determined based on the data associated with the at least two contiguous road segments, comprising for each of the at least two contiguous road segments:

a representative of a first metric associated with spatial properties associated with the respective road segment;

at least one representative of a second metric associated with at least one dynamic event associated with the respective road segment; and at least one representative of a third metric associated with a speed associated with the respective road segment.

For instance, said representative of a first metric associated with spatial properties associated with the single road segment may be $s_s$, a representative of the at least one representative of a second metric associated with at least one dynamic event associated with the single road segment may be $d_s(t)$, and a representative of the at least one representative of a third metric associated with a speed associated with the single road segment may be $v_s(t)$.

Furthermore, it may be assumed that n≥2, contiguous road segments are aggregated to the single road segment, wherein $s_i$ with i∈{1, ... n} may represent the different representatives of a first metric respectively associated with spatial properties associated with the n road segments, wherein $d_i(t)$ with i∈{1, ... n} may represent the different representatives of a second metric associated with at least one dynamic event associated with the n road segments, and wherein $v_i(t)$ with i∈{1, ... n} may represent the different representatives of a third metric associated with a speed associated with the n road segments.

Then, as an example, said representative of the at least one representative of a first metric associated with spatial properties associated with the single road segment $s_s$ may be calculated as a value proportional to the mean value of the different representatives $s_i$ of a first metric respectively associated with spatial properties associated with the n road segments, e.g.:

$$s_s = \frac{\sum_1^n s_i}{n}$$

Furthermore, as an example, said representative of the at least one representative of a second metric associated with at least one dynamic event associated with the single road segment $d_s(t)$, may be calculated as a value proportional to the mean value of the different representatives $d_i(t)$ of a second metric associated with at least one dynamic event associated with the n road segments, e.g.:

$$d_s(t) = \frac{\sum_1^n d_i(t)}{n}$$

And, as an example, said representative of the at least one representative of a third metric associated with a speed associated with the single road segment $v_s(t)$, may be calculated as a value proportional to the mean value of the different representatives $v_i(t)$ of a third metric associated with a speed associated with the n road segment, e.g.:

$$v_s(t) = \frac{\sum_1^n v_i(t)}{n}$$

As an example embodiment, such a single road segment, which has been generated based on aggregating at least two contiguous road segment, may be considered as a "normal" road segment, and, for instance, said providing (action 202 depicted in FIG. 2), for at least one road segment of the at least one road segment, safety data of the respective road segment at least partially based on the representative of the first metric, the at least one representative of the second metric and the at least one representative of the third metric associated with the respective road segment, may be performed for such single road segment, where the safety data of the respective single road segment may at least partially based on the representative of the first metric, the at least one representative of the second metric and the at least one representative of the third metric associated with the respective single road segment. Furthermore, as an example, said safety data of the respective single road segment may further comprise or may comprise at least a part of the data associated with the at least two contiguous road segments which have been aggregated to the respective single road segment, comprising for each of the at least two contiguous road segments:

a representative of a first metric associated with spatial properties associated with the respective road segment;

at least one representative of a second metric associated with at least one dynamic event associated with the respective road segment; and at least one representative of a third metric associated with a speed associated with the respective road segment.

E.g., once data associated and/or safety data with a single road segment has been determined, this data and/or safety data may be provided by the at least one apparatus 100 or the server 300 to at least one mobile device 310, 311, 312, 320, e.g. during action 202 of method 200.

Figure 9:
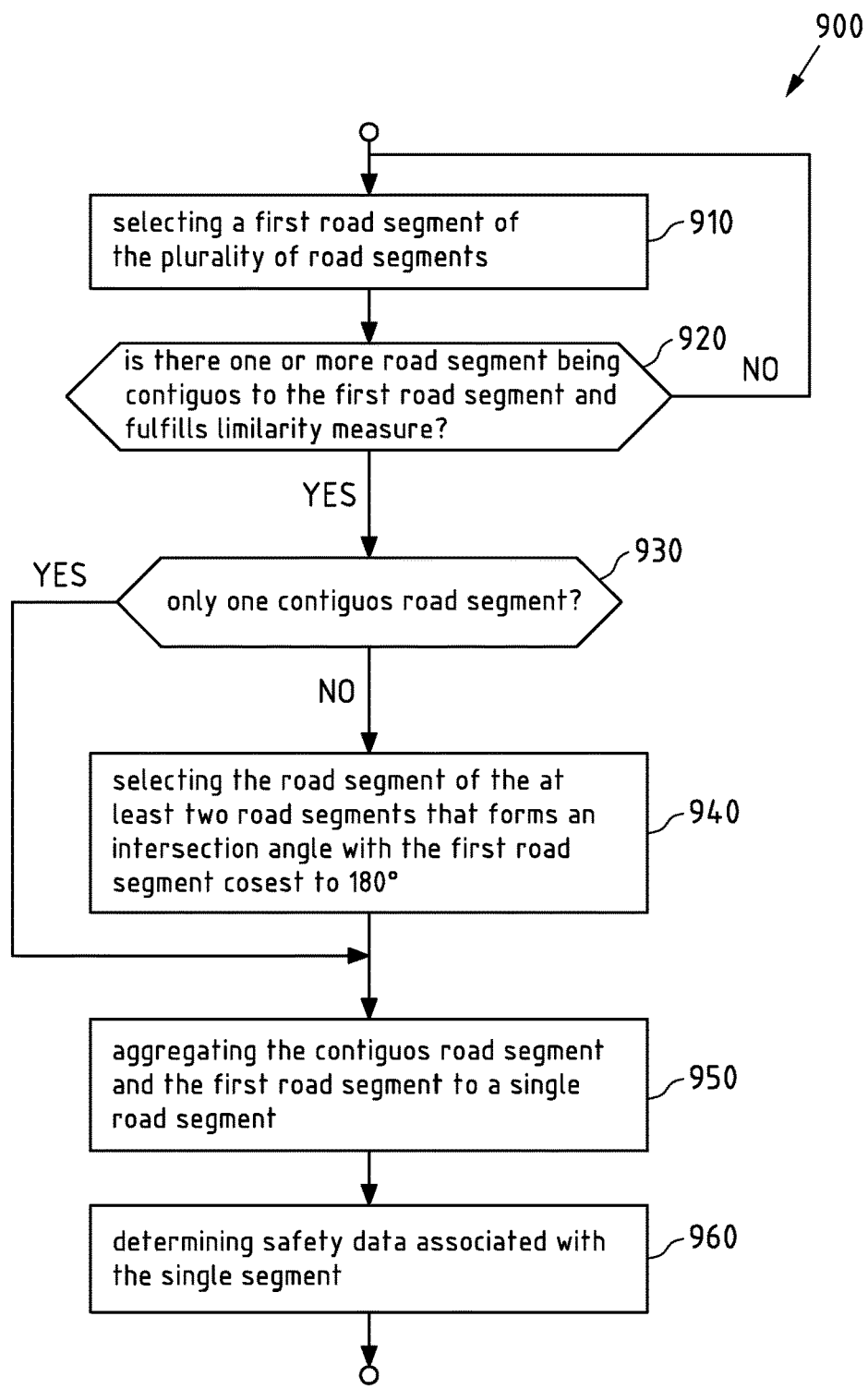
FIG. 9 is a flow chart illustrating an example embodiment of a method according to the invention.

FIG. 9 is a flow chart illustrating an example embodiment of a method according to the invention. Method 900 may be performed by the at least one apparatus 100 or the server 300. It is assumed that the at least one road segment represents a plurality of road segments. For instance, this method 900 may be used as example of method 800 depicted in FIG. 8 and thus, method 900 may be used to aggregate at least two contiguous road segments of the plurality of road segments into a single road segment based (e.g. at least partially) on the data associated with the at least two contiguous road segments.

A first road segment of the plurality of road segments is selected (action 910).

Then it may be checked whether there is one or more road segment being contiguous to the first road segment, wherein the one or more road segment fulfils the similarity measure.

Figure 10A:
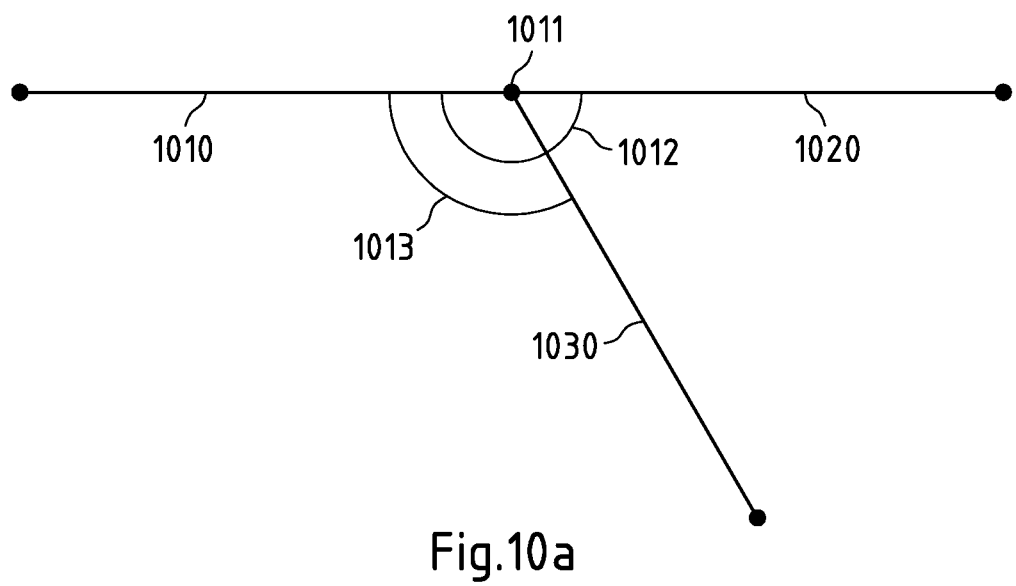
FIG. 10a depicts an example of several road segments.

For instance, said one or more road segments may be considered to be contiguous to a first road segment if the one or more road segments are connected to the first road segment at the same intersection point. As an example depicted in FIG. 10, the first road segment may comprise an intersection point 1011 which links the first road segment to a second road segment 1020 and to a third road segment 1030. Thus, as an example, both the second road segment 1020 as well as the third road segment 1030 could be considered to be contiguous to the first road segment.

As a further example, a road segment may be considered to be contiguous to the first road segment if the intersection angle at the intersection point between the road segment and the first road segment is higher than a threshold, wherein this threshold may be 140°, or 120° or 105°. As an example, with respect to the first road segment 1010 and the second road segment 1020 depicted in FIG. 10*a*, the intersection angle between the first road segment 1010 and the second road segment 1020 at the intersection point 1011 is identified by reference number 1012 and the intersection angle between the first road segment 1010 and the third road segment 1020 at the intersection point 1011 is identified by reference number 1013. Thus, it may be avoided that two road segments are considered to be contiguous if the change of direction is to big when driving from the first to the second road segment. Thus, for instance, with respect to the example depicted in FIG. 10*a*, only the second road segment 1020 might be considered to be contiguous to the first road segment since the intersection angle 1013 between the first road segment 1010 and the third road segment is below the threshold.

Furthermore, as example, each of the one or more contiguous road segments must fulfill at least one of the following geometric criteria with respect to the first road segment: (i) an intersection angle between the two contiguous road segments is higher than the threshold; and (ii) the sum of the lengths of the first road segment and the respective contiguous road segments is less than a length threshold. Thus, it may be checked during action 920 whether there is one or more road segment being contiguous to the first road segment, wherein each of the one or more road segment fulfills the similarity measure with respect to the first road segment, and wherein each of the one or more road segment fulfills the one or more geometric criteria (i.e. one of two geometric criteria or both or the two geometric criteria) with respect to the first road segment.

The length threshold may avoid that the single road segment will be too long.

If it is detected that there is exactly one road segment being contiguous to the first road segment and that fulfils the at least one geometric criteria and the similarity measure with respect to the first road segment, this road segment being contiguous to the first road segment may be selected and the selected road segment and the first road segment are aggregated into a single road segment (action 950), as explained with respect to method 800.

As an example, if there is no road segment contiguous to the first road segment and that fulfils the at least one geometric criteria and the similarity measure the method 900 may return to action 910 in order to select a new first road segment of the plurality of road segments.

Figure 10B:
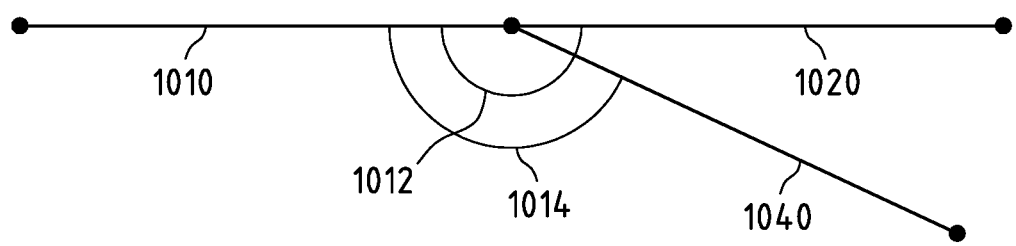
FIG. 10b depicts an example of several road segments.

If it is detected that there are two or more road segments, each being contiguous to the first road segment and each fulfilling the at least one geometric criteria and the similarity measure with respect to the first road segment (actions 920 and 930), the road segment of the two or more road segments may be selected that forms an intersection angle with the first road segment closest to 180° (action 940). For instance, as depicted in FIG. 10*b*, road segment 1010 may represent the first road segment, and the second road segment 1020 may be considered be contiguous to the first road segment 1010 and to meet the similarity measure and each of the at least one geometric criteria with respect to the first road segment, and the third road segment 1040 may be considered be contiguous to the first road segment 1010 and to meet the similarity measure and each of the at least one geometric criteria with respect to the first road segment 1010. Thus, the second road segment 1020 and the third road segment 1040 might be considered to represent two or more road segments being contiguous to the first road segment and each fulfilling the at least one geometric criteria and the similarity measure with respect to the first road segment (actions 920 and 930). In this case, as an example, the second road segment 1020 may be selected since the intersection angel 1012 between the second road segment 1020 and the first road segment 1010 is closer to 180° than the intersection angle 1014 between the third road segment 1040 and the first road segment 1010 (action 940). Then, the selected road segment (i.e., in this example the second road segment 1020) and the first road segment 1010 are aggregated into a single road segment (action 950), as explained with respect to method 800.

Furthermore, as an example, data associated with the single road segment that has been generated based on the aggregation of the first road segment and the selected contiguous road segment is determined (action 960), wherein this determining of data associated with the single road segment may be performed as described with respect to method 800.

As a further embodiment, said method 900 may be performed at least partially recursively, i.e. the first road segment selected in action 910 may represent a single road segment which has been generated based on aggregating another first road segment with a contiguous road segment (e.g. in former action 950).

Furthermore, for instance, it has to be understood that single road segments produced from aggregation might have different properties; while some would have representatives indicating a high suitability of driving, others might have representatives indicating a low suitability of driving.

Figure 11:
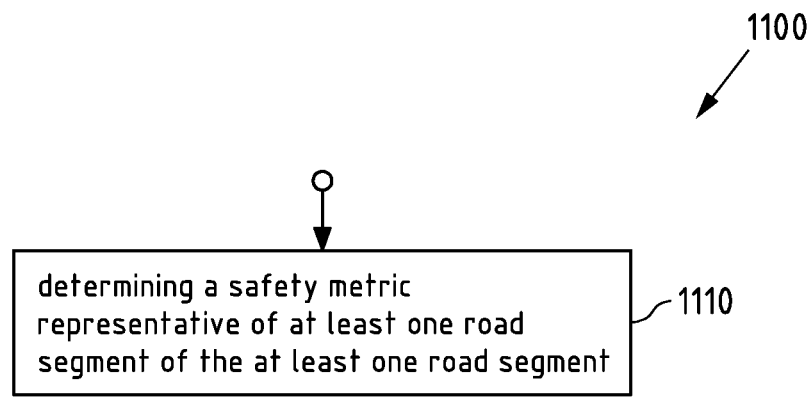
FIG. 11 is a flow chart illustrating an example embodiment of a method according to the invention.

FIG. 11 is a flow chart illustrating an example embodiment of a method according to the invention. Method 1100 may be performed by the at least one apparatus 100 or the server 300, or, as another example embodiment of the invention, it may be performed by a mobile device 320 which may be associated with a vehicle, in particular an AV.

A safety metric representative of at least one road segment of the at least one road segment is determined (action 1110), wherein, for instance, for each road segment of the at least one road segment of the at least one road segment the safety metric representative is determined based on at least two selected representatives of:
(i) the representative of a first metric associated with spatial properties associated with the respective road segment (e.g., $s_i$);
(ii) a representative of the at least one representative of the second metric associated with at least one dynamic event associated with the respective road segment (e.g., $d_i(t)$; and
(iii) a representative of the at least one representative of the third metric associated with a speed associated with the respective road segment (e.g., $v_i(t)$).

For instance, the safety metric representative may be denoted as $sm_i(t)$, wherein i denotes the respective road segment and t represents the point in time or period of time associated with the safety metric representative.

As a non-limiting example, under the assumption that a higher value of $s_i$ indicates that this road segment i has a better suitability for driving regarding the spatial properties associated with this road segment compared to a lower value and that a higher value of $d_i(t)$ indicates that this road segment i has a better suitability for driving regarding the at least one dynamic event associated with this road segment compared to a lower value $d_i(t)$, and that a higher value of $v_i(t)$ indicates that this road segment i has a better suitability for driving regarding the at least one dynamic event associated with this road segment compared to a lower value, the safety metric $sm_i(t)$ may be determined such that a higher value of $sm_i(t)$ indicates that this road segment i has a better suitability for driving compared to a lower value of $sm_i(t)$. For instance, $s_{start} = d_{start} = v_{start} = 0$ may hold and the safety metric representative $sm_i(t)$ may be calculated to be proportional to $$\sqrt{(w1\square(s_{end} - s_i)^2) + (w2\square(d_{end} - d_i(t))^2) + (w3\square(v_{end} - v_i(t))^2)},$$

wherein, for instance, $$sm_i(t) = \sqrt{(w1\square(s_{end} - s_i)^2) + (w2\square(d_{end} - d_i(t))^2) + (w3\square(v_{end} - v_i(t))^2)}$$

may hold.

Values w1, w2 and w3 may represent optional weighting factors. These optional weighting factors may be used as tuning parameters that enable to configured which metric of the first, second and third metric should carry more weight in producing the magnitude of the safety metric representative $sm_i(t)$. As an example, $w1+w2+w3=(s_{end}+d_{end}+s_{end})/3$ may hold.

Or, as another non-limiting example, under the assumption that a lower value of $s_i$ indicates that this road segment i has a better suitability for driving regarding the spatial properties associated with this road segment compared to a higher value $s_i$, and that a lower value of $d_i(t)$ indicates that this road segment i has a better suitability for driving regarding the at least one dynamic event associated with this road segment compared to a higher value $d_i(t)$, and that a lower value of $v_i(t)$ indicates that this road segment i has a better suitability for driving regarding the at least one dynamic event associated with this road segment compared to a higher value, the safety metric $sm_i(t)$ may be determined such that a lower value of $sm_i(t)$ indicates that this road segment i has a better suitability for driving compared to a higher value of $sm_i(t)$. For instance, $s_{start} = d_{start} = v_{start} = 0$ may hold and the safety metric representative $sm_i(t)$ may be calculated to be proportional to $$\sqrt{(w1\square(s_i)^2) + (w2\square(d_i(t))^2) + (w3\square(v_i(t))^2)}, \text{ wherein, for instance,}$$

$$sm_i(t) = \sqrt{(w1\square(s_i)^2) + (w2\square(d_i(t))^2) + (w3\square(v_i(t))^2)} \quad \text{may hold.}$$

Values w1, w2 and w3 may represent optional weighting factors. These optional weighting factors may be used as tuning parameters that enable to configured which metric of the first, second and third metric should carry more weight in producing the magnitude of the safety metric representative $sm_i(t)$. As an example, $w1+w2+w3=(s_{end}+d_{end}+s_{end})/3$ may hold.

As an example embodiment, a user of the mobile device 320 which may be integrated into a vehicle, in particular an AV, may input or influence the weighting factors, e.g. by means of user interface of the mobile device 320, and, as a first example embodiment, these weighting factors may be transmitted to the first apparatus 100 or the server 300, wherein the server determines the at least one safety metric representative $sm_i(t)$ associated with the at least one road segment (e.g. in according with method 1110), and wherein the at least one safety metric representative $sm_i(t)$ may be provided from the first apparatus 100 or the server 300 to the mobile device 320. Or, as a second example embodiment, the mobile device 320 may receive the safety data associated with the at least one road segment (e.g. based on action 202), and the mobile device 320 may be configured to determine the at least one safety metric representative $sm_i(t)$ associated with the at least one road segment (e.g. in accordance with method 100).

Figure 12:
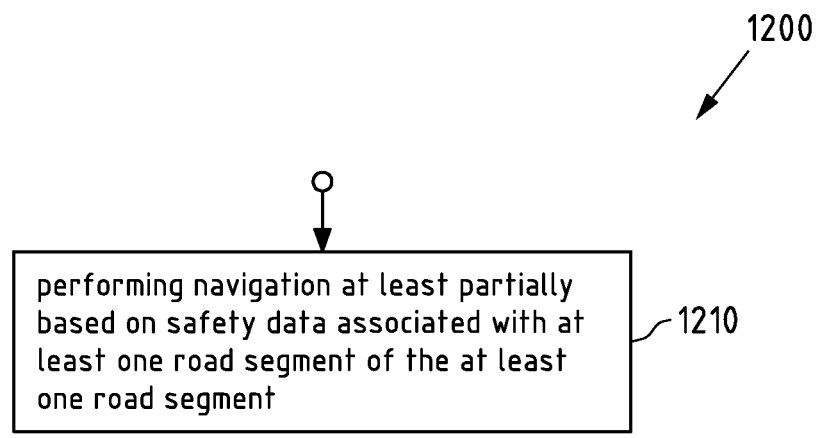
FIG. 12 is a flow chart illustrating an example embodiment of a method according to the invention, wherein this method may represent a different aspect of the invention.

FIG. 12 is a flow chart illustrating an example embodiment of a method 1200 according to the invention. Method 1200 may by a mobile device 320 which may be associated with a vehicle, in particular an AV.

Method 1200 comprises performing navigation, in particular of an autonomous vehicle, at least partially based on safety data of at least one road segment of the at least one road segment.

For instance, said safety data may be received at the mobile device 320 from the at least one apparatus 100 or server 300 (e.g. during action 202). As an example, method 1200 may comprise receiving the safety data associated with the at least one road segment, wherein the safety data comprises for each of the at least one road segment: (i) a representative of a first metric associated with spatial properties associated with the respective road segment; (ii) at least one representative of a second metric associated with at least one dynamic event associated with the respective road segment; and (iii) at least one representative of a third metric associated with a speed associated with the respective road segment.

For instance, this navigation may comprise determining a route along one or more road segments of the at least one road segment at least partially based on the safety data. As an example, it may be assumed that at least one road segment represent a plurality of road segments.

Said determining a route along one or more road segments of the plurality of road segments may be performed, based on a safety demand which may be provided by a user. That safety demand may be indicate whether the user is more risk-averse and may (always) prefer a safer route compared to a faster route, and the safety demand may indicate whether the user is less risk-averse and may (always) prefer a faster rout. For instance, the safety demand may be represented by a value with might be proportional or inverse proportional to a user's demand on safety when driving a route comprising at least one road segment.

A safer route may be a route with lesser probabilities of having incidents or traffic congestion or bad weather, etc. The concept of safest route may usually come up in a multi-criteria routing strategy, where the safest route is optimized with faster rout, i.e., routing the driver through the fastest safer route.

Thus, when performing said navigation a route may be determined, said route comprising at least one road segment of the plurality of road segments, wherein the safety data associated with this at least one road segment of the route may fulfil the safety demand or may be closest to the safety demand compared to other road segments. Accordingly, the at least one road segment of the route may be chosen in order to fulfil the safety data demand or to be closest to the safety data demand. For instance, if the safety data demand shows that safest route strategy shall be applied, the at least one road segment of the route may be selected such that the suitability of driving along this at least one road segment may be maximized, wherein this might comprise choosing the at least one road segment having lowest probability of having incidents or traffic congestion or bad weather, etc.

For instance, the three metrics of a road segment may be used for performing said navigation, but it may also be possible that only one of the three metrics of a road segment or two metrics of the three metrics of a road segment may be used for performing said navigation.

Furthermore, as an example, a safety metric for each road segment of different road segments of the plurality of road segments may be determined as described above (i.e., based at least partially based on the safety data), wherein this may be performed by the mobile device performing said navigation. Furthermore, the optional weighting factors may be applied in order to adjust the impact of the first, second and third metric in accordance with user's demands. For instance, said optional weighting factors may be inputted by a user via an interface of the mobile device performing the navigation and may be stored in a memory of the mobile device. For instance, the value of a safety metric may be assumed to be proportional to a risk probability associated with this road segment, wherein the risk probability may be considered to be filtered in accordance with the optional weighting factors. As an example, the safety metric representative of a road segment of the at least one road segment is represented by a value within a predefined rage.

Figure 13:
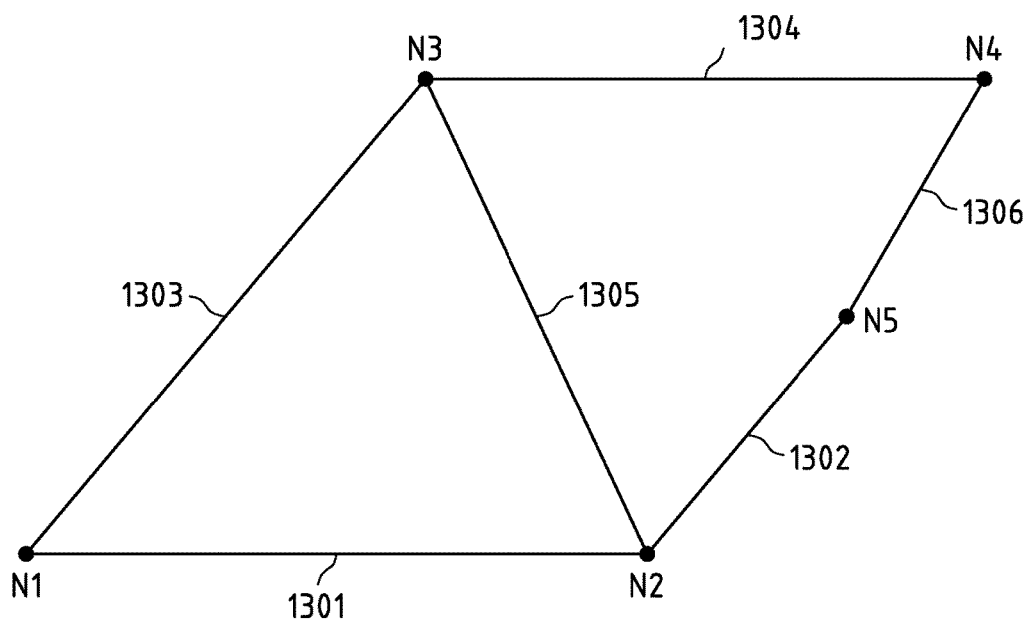
FIG. 13 depicts an example of several road segments.

An example for performing navigation according to action 1210 may be explained with respect to the example of five road segments 1301, 1302, 1303, 1304, 1305 depicted in FIG. 13. For instance, said navigation may be used for determine a route from point N1 to point N5. For instance, the safety metric of road segment 1301 may be P=0.2, the safety metric of road segment 1302 may be P=0.5, the safety metric of road segment 1303 may be P=0.2, the safety metric of road segment 1304 may be P=0.1, the safety metric of road segment 1305 may be P=0.8, and the safety metric of road segment 1306 may be P=0.2, wherein the range of the safety metric may be between 0 and 1, wherein 1 may indicate a very unsafe road segment and 0 may indicate a very safe road segment.

For instance, if the safety demand indicates that safest route shall be determined, a route starting from N1 via the road segment 1303, point N3, road segment 1304, point N4 and road segment 1306 may be determined for navigation, since the probability of risk is reduced or minimized based on the safety metrics of the road segments.

Furthermore, as an example embodiment, the safety demand may comprise a probability value indicating the maximum risk probability the user accepts. Then, only those road segments may be used for building a route for navigation in action 1210 which safety metrics does not exceed the maximum risk probability. If there are different road segments that fulfil the safety demand, those road segments may be chosen that fulfill another criteria, wherein this other criteria may be fastest path or shortest path.

For instance, a travel-time may be associated with each road segment. Then, with respect to an example of performing navigation from point N1 to point N5 in FIG. 13 and under the assumption that the other criteria is fastest path, those road segments are selected building a path from point N1 to point N5 that fulfil the safety demand and ensure shortest travel-time based the travel-times associated with the road segments. As an example, said travel-time associated with a road segment may be determined based on the representative of the second metric of this road segment, wherein this representative may indicate the average speed on this road segment, and the length associated with this road segment.

Or, for instance, a length may be associated with each road segment. Then, with respect to an example of performing navigation from point N1 to point N5 in FIG. 13 and under the assumption that the other criteria is shortest path, those road segments are selected building a path from point N1 to point N5 that fulfil the safety demand and ensure shortest path-length-time based the lengths associated with the road segments.

Furthermore, the mobile device 320 may receive updates of the safety data for at least one road segment during operation such that navigation in action 1210 may be updated and new paths for navigating to a destination may be calculated based on the updated safety data. For instance, based on the representative of the second metric the mobile device 320 may be informed on actual dynamics on at least one road segments, e.g. an accident that suddenly happened on road segment or any other incidents, such that this information can be used for updating navigation. Thus, actual safety warnings transmitted by the representatives of the second metric may be considered for navigation.

As an example embodiment, said safety data may comprise for a representative of the at least one representative of a second metric associated with at least one dynamic event associated with the respective road segment a confidence metric associated with the respective representative of the second metric, wherein the safety data may comprises such confidence metric for each of two or more (or all) representatives of the second metric of this this safety data, and/or, as an example, said safety data may comprise for a representative of the at least one representative associated with a speed associated with the respective road segment a confidence metric associated with the respective representative of the third metric, wherein the safety data may comprises such confidence metric for each of two or more (or all) representatives of the third second metric of this this safety data.

Thus, said navigation performed in action 1210 may further be based at least partially on said confidence metric of the safety data. For instance, a confidence metric associated with a representative of the second or third metric may be assumed to represent at least one stochastic value and/or may comprise a standard-deviation value and/or variance value of the representative of the second or third metric. Then, as an example, a representative of the second or the third metric of a road segment might be weighted by the confidence metric associated with this road segment, before navigation is performed based on the weighted representatives of the second and/or third metrics.

For instance, stochastic routing may be performed in action 1210 where the arc-cost metrics are probabilistic estimates and may be time varying.

Thus, for instance, said navigation performed in action 1210 may be performed by a mobile device being associated with an AV, wherein the mobile device may be integrated in the AV, based on the provided safety data of the at least one road segment.

Figure 14:
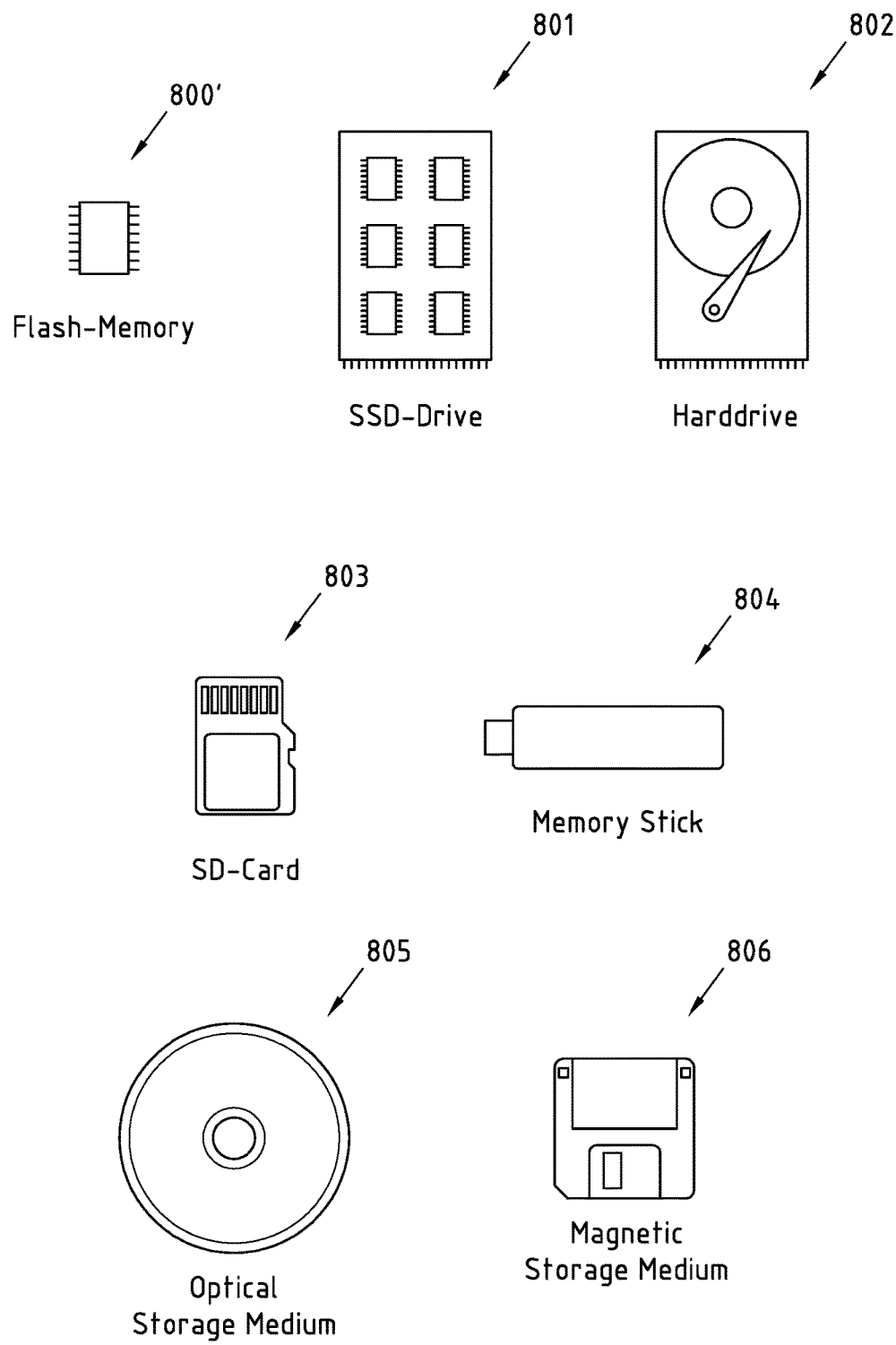
FIG. 14 is a schematic illustration of examples of tangible storage media according to the present invention.

FIG. 14 is a schematic illustration of examples of tangible storage media according to the present invention, that may for instance be used to implement memory 11 of FIG. 1, program memory 303 of FIG. 3 and/or program memory 304 of FIG. 3. To this end, FIG. 8 displays a flash memory 800', which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 10, 20 and 30 of FIGS. 1, 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Furthermore, the wording "at least one of (i) . . . , (ii) . . . (n)" comprising n elements has to be understood that only one element of the n elements may be selected, or any combination of two or more of the n elements may be selected, or, that all n elements may be selected.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method, comprising:
   holding available, by at least a first apparatus, data associated with each road segment of one or more road segments, said data comprising:
   a representative of a first metric associated with spatial properties associated with the respective road segment, wherein the spatial properties correspond to the topology of the respective road segment based on map data;
   at least one representative of a second metric associated with at least one dynamic event associated with the respective road segment, wherein the at least one dynamic event is an event corresponding to a point in time or a period of time; and
   at least one representative of a third metric associated with a speed associated with the respective road segment, wherein the speed is determined based on probe data,
   wherein (a) at least one of the representative of the first metric, the representative of the second metric, or the representative of the third metric corresponds to a driving difficulty of the respective road segment, (b) the one or more road segments comprise a first road segment and a second road segment, and (c) the first and second road segments are contiguous,
   responsive to determining that at least one of (a) a first representative of the first metric associated with the first segment and a second representative of the first metric associated with the second segment satisfy a first similarity measure, (b) a first representative of the second metric associated with the first segment and a second representative of the second metric associated with the second segment satisfy a second similarity measure, or (c) a first representative of the third metric associated with the first segment and a second representative of the third metric associated with the second segment satisfy a third similarity measure, aggregating (i) the first and second representatives of the first metric to generate an aggregated representative of the first metric, (ii) the first and second representatives of the second metric to generate an aggregated representative of the second metric, and (iii) the first and second representatives of the third metric to generate an aggregated representative of the third metric;
   aggregating the aggregated representative of the first metric, the aggregated representative of the second metric, and the aggregated representative of the third metric to generate a safety data value representative of the suitability of the first and second road segments for driving; and
   providing, by said at least one first apparatus, the safety data value at least partially based on the aggregated representative of the first metric, the aggregated representative of the second metric, and the aggregated representative of the third metric associated with the respective road segment.

2. The method according to claim 1, wherein a representative of the first metric may be a value being indicative of the suitability of driving on the road segment based on spatial properties associated with the road segment, and a representative of the at least one representative of the second metric may be a value being indicative of the suitability for driving on the road segment based on the at least one dynamic event associated with the respective road segment, and wherein a representative of the at least one representative of a third metric associated with a speed associated with the respective road segment may be indicative of the suitability for driving on the road segment based on the speed associated with the respective segment.

3. The method according to claim 1, wherein said representative of the first metric indicates a measure how curvy a trajectory of the road segment is.

4. The method according to claim 1, wherein said representative of the first metric indicates a sinuosity of the road segment.

5. The method according to claim 1, wherein said determining a representative of the first metric associated with spatial properties is based on at least one angle in a trajectory of the road segment.

6. The method according to claim 1, comprising determining a representative of the first metric associated with spatial properties based on map-data associated with the respective road segment, wherein said determining the representative of the first metric associated with spatial properties is based on at least one of:
   number of intersections associated with the road segment; and
   number of lanes associated with the road segment.

7. The method according to claim 1, comprising determining at least one representative of the at least one representative of a second metric associated with at least one dynamic event associated with the respective road segment at least partially based on at least one set of data associated with this road segment and receiving a plurality of sets of data from at least one mobile device, wherein a set of data from the sets of data comprises at least one of:
   an identifier (ID),
   a timestamp (time),
   velocity data,
   location based data,
   rating data, or
   feedback data.

8. The method according to claim 7, comprising determining at least one representative of the at least one representative of a third metric associated with a speed associated with the respective road segment at least partially based on at least one set of data associated with this road segment.

9. The method according to claim 1, wherein a representative of the second metric associated with at least one dynamic event is indicative of a degree of uncertainty in safe driving of the respective road segment.

10. The method according to claim 1, wherein the at least one dynamical event comprises at least one of a:
    weather event,
    incident event,
    venue event, or
    movement of objects on the road segment.

11. The method according to claim 10, wherein said movement of objects on the road segment includes at least one of movement of pedestrians and movement of bicycles.

12. The method according to claim 1, wherein a representative of the third metric is determined based on an average speed associated with the respective road segment.

13. The method according to claim 1, wherein said method further comprising aggregating at least one third road segment that is contiguous to at least one of the first road segment and the second road segment based on the data associated with the first, second, and third contiguous road segments.

14. The method according to claim 13, wherein said aggregating is performed in a way that representatives of the first, second, and third contiguous road segments are within in a similarity measure.

15. The method according to claim 1, wherein said similarity measure is a predefined distance which is determined based on representatives of the first road segment and the second road segments based on at least one of:
   a first difference or ratio between the first representative of the first metric associated with spatial properties associated with the first road segment and the second representative of the first metric associated with spatial properties associated with the second road segment;
   a second difference or ratio between the first representative of the second metric associated with at least one dynamic event associated with the first road segment and the second representative of the second metric associated with at least one dynamic event associated with the second road segment; and
   a third difference or ratio between the first representative of the third metric associated with a speed associated with the first road segment and the second representative of the third metric associated with a speed associated with the second road segment.

16. The method according to claim 1, comprising, for each road segment of at least one road segment of the one or more road segments, selecting at least two of:
   (i) the representative of the first metric associated with spatial properties associated with the respective road segment;
   (ii) the representative of the second metric associated with the at least one dynamic event associated with the respective road segment; or
   (iii) the representative of the third metric associated with the speed associated with the respective road segment;
   wherein the method optionally comprises weighting at least one of the at least two selected representatives with a weighting factor before determining the safety metric.

17. An apparatus comprising:
   at least one processor; and
   at least one memory including computer program code for one or more programs;
   the at least one memory and the computer program code configured to, with the at least one processor, cause the apparatus to determine an aggregated safety data of a first road segment and a second road segment, the first and second road segments being contiguous, at least partially based on:
   a first first metric associated with spatial properties associated with the first road segment, wherein the spatial properties correspond to the topology of the respective road segment based on map data;
   a second first metric associated with spatial properties associated with the second road segment, wherein the spatial properties correspond to the topology of the respective road segment based on map data;
   a first second metric associated with at least one dynamic event associated with the first road segment, wherein the at least one dynamic event is an event corresponding to a point in time or a period of time;
   a second second metric associated with at least one dynamic event associated with the second road segment, wherein the at least one dynamic event is an event corresponding to a point in time or a period of time;
   a first third metric associated with a speed associated with the first road segment, wherein the speed is determined based on probe data; and
   a second third metric associated with a speed associated with the second road segment, wherein the speed is determined based on probe data, wherein at least one of the first first metric, the first second metric, or the first third metric corresponds to a driving difficulty of the first road segment, wherein the aggregated safety data is generated by:

responsive to determining that at least one of (a) a first first metric associated with the first segment and a second first metric associated with the second segment satisfy a first similarity measure, (b) a first second metric associated with the first segment and a second second metric associated with the second segment satisfy a second similarity measure, or (c) a first third metric associated with the first segment and a second third metric associated with the second segment satisfy a third similarity measure, aggregating (i) the first and second first metrics to generate an aggregated first metric, (ii) the first and second second metrics to generate an aggregated second metric, and (iii) the first and second third metrics to generate an aggregated third metric;

aggregating the aggregated first metric, the aggregated second metric, and the aggregated third metric to generate an aggregated safety data value representative of the suitability of the respective road segment for driving.

18. The apparatus according to claim 17 wherein the at least one memory and the computer program code are configured to, with the processor, cause the apparatus to:

determine a second safety data of the second road segment at least partially based on:

the second first metric associated with spatial properties associated with the second road segment;

the second second metric associated with at least one dynamic event associated with the second road segment; and the second third metric associated with a speed associated with the second road segment, wherein the first road segment is contiguous with the second road segment; and aggregate the second first metric, the second second metric, and the second third metric to provide the second safety data.

19. The apparatus according to claim 17, wherein aggregating the first and second first metrics comprises at least one of (a) averaging the first and second first metrics or (b) performing a weighted average of the first and second first metrics, aggregating the first and second second metrics comprises at least one of (a) averaging the first and second second metrics or (b) performing a weighted average of the first and second second metrics, and aggregating the first and second third metrics comprises at least one of (a) averaging the first and second third metrics or (b) performing a weighted average of the first and second third metrics.

20. The apparatus according to claim 17, wherein said similarity measure is a predefined distance which is determined based on at least one of:

a first difference or ratio between the first first metric associated with spatial properties associated with the first road segment and the second first metric associated with spatial properties associated with the second road segment;

a second difference or ratio between the first second metric associated with at least one dynamic event associated with the first road segment and the second second metric associated with at least one dynamic event associated with the second road segment; and a third difference or ratio between the first third metric associated with a speed associated with the first road segment and the second third metric associated with a speed associated with the second road segment.

* * * * *